(12) United States Patent
Wong et al.

(10) Patent No.: US 11,780,078 B2
(45) Date of Patent: Oct. 10, 2023

(54) SELF-MOVING DEVICE AND AUTOMATIC WORKING SYSTEM THEREOF

(71) Applicant: Positec Power Tools (Suzhou) Co., Ltd, Jiangsu (CN)

(72) Inventors: Ka Tat Kelvin Wong, Jiangsu (CN); Fengli Zhao, Jiangsu (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 830 days.

(21) Appl. No.: 16/816,767

(22) Filed: Mar. 12, 2020

(65) Prior Publication Data
US 2020/0206896 A1 Jul. 2, 2020

Related U.S. Application Data

(63) Continuation of application No. PCT/CN2018/105246, filed on Sep. 12, 2018.

(51) Int. Cl.
*B25J 5/00* (2006.01)
*B25J 15/00* (2006.01)
(Continued)

(52) U.S. Cl.
CPC .............. *B25J 5/007* (2013.01); *A01D 43/00* (2013.01); *B25J 9/0087* (2013.01); *B25J 9/1664* (2013.01); *B25J 13/086* (2013.01); *B25J 13/089* (2013.01); *B25J 15/0019* (2013.01); *B25J 15/0066* (2013.01); *B25J 15/0206* (2013.01); *B25J 15/0608* (2013.01); *B25J 19/06* (2013.01); *A01D 34/008* (2013.01)

(58) Field of Classification Search
CPC ....... A01D 34/008; A01D 43/00; B25J 5/007;
B25J 9/0087; B25J 9/1664; B25J 13/086;
B25J 13/089; B25J 15/0019; B25J
15/0066; B25J 15/0206; B25J 15/0608;
B25J 19/06
See application file for complete search history.

(56) References Cited

U.S. PATENT DOCUMENTS

2007/0050937 A1 3/2007 Song et al.
2010/0155156 A1* 6/2010 Finkelstein .............. B25J 5/007
901/1

(Continued)

FOREIGN PATENT DOCUMENTS

CN 101849481 A 10/2010
CN 104782326 A 7/2015
(Continued)

*Primary Examiner* — Dale Moyer
(74) *Attorney, Agent, or Firm* — Dentons US LLP

(57) ABSTRACT

The present invention relates to a self-moving device (100). The self-moving device (100) includes a body (20), a walking mechanism (40) disposed on the body (20) and configured to drive the self-moving device (100) to walk, a connecting arm (60) connected to the body (20), and a control module (11) configured to control the walking mechanism (40) to drive the self-moving device (100) to walk within a defined area. The connecting arm (60) is selectively connected to at least one of at least two working heads (200) configured to perform different work tasks. The connecting arm (60) includes a connecting structure (64) configured to be connected to the working head (200) and a connecting component (62) configured to connect the connecting structure (64) to the body (20).

19 Claims, 10 Drawing Sheets

(51) Int. Cl.
  *B25J 15/02* (2006.01)
  *B25J 15/06* (2006.01)
  *A01D 43/00* (2006.01)
  *B25J 13/08* (2006.01)
  *B25J 9/00* (2006.01)
  *B25J 19/06* (2006.01)
  *B25J 9/16* (2006.01)
  *A01D 34/00* (2006.01)

(56) References Cited

U.S. PATENT DOCUMENTS

| | | | | |
|---|---|---|---|---|
| 2014/0373497 A1* | 12/2014 | Bjorn | ................... | A01D 75/18 56/10.2 R |
| 2018/0317373 A1* | 11/2018 | Nielsen | ................ | A01D 34/661 |
| 2022/0305672 A1* | 9/2022 | Meduna | .................... | B25J 9/08 |

FOREIGN PATENT DOCUMENTS

| | | | |
|---|---|---|---|
| CN | 105501321 | A | 4/2016 |
| CN | 105573311 | A | 5/2016 |
| CN | 105706637 | A | 6/2016 |
| CN | 106416592 | A | 2/2017 |
| CN | 107135685 | A | 9/2017 |
| CN | 207639110 | U | 7/2018 |
| WO | 2010053957 | A1 | 5/2010 |
| WO | 2014/007729 | A1 | 1/2014 |

\* cited by examiner

SELF-MOVING DEVICE AND AUTOMATIC WORKING SYSTEM THEREOF

This application is a Continuation Application of International Application No. PCT/CN2018/105246, filed on Sep. 12, 2018, which claims benefit of and priority to Chinese Patent Application Nos. 201710817830.7, filed on Sep. 12, 2017 and 201721166271.X, filed on Sep. 12, 2017, all of which are hereby incorporated by reference in their entirety for all purposes as if fully set forth herein.

BACKGROUND

Technical Field

The present invention relates to a self-moving device and an automatic working system thereof.

Related Art

With the progress of society and the development of technology, various power tools gradually enter people's production and life and bring great convenience to people's production and life. Particularly, in the fields of horticulture and gardening, people need to use various power tools such as a lawnmower, a trimmer, a chainsaw, and a blower to cut grass, clean road, and perform other work.

SUMMARY

Various power tools have unvaried structures and functions, and each power tool usually can complete only one type of work, resulting in high working costs and low working efficiency. In view of this, it is necessary to provide a self-moving device having various functions and an automatic working system thereof.

The following technical solution may be adopted in the present embodiments:

A self-moving device, comprising: a body; a walking mechanism, disposed on the body and configured to drive the self-moving device to walk; a connecting arm, connected to the body; and a control module, configured to control the walking mechanism to drive the self-moving device to walk within a defined area, wherein the connecting arm is selectively connected to at least one of at least two working heads configured to perform different work tasks, and the connecting arm comprises a connecting structure configured to be connected to the working head and a connecting component configured to connect the connecting structure and the body.

In one embodiment, the control module is configured to control working statuses of the connecting arm and/or the working head.

In one embodiment, the connecting arm is controllable by the control module to autonomously move.

In one embodiment, an extension range of the connecting arm exceeds a range covered by a projection of the body in a horizontal direction.

In one embodiment, the connecting arm is connected to the body and is movable relative to the body.

In one embodiment, the connecting component is connected to the body and is movable relative to the body.

In one embodiment, the connecting component comprises a movable fastening end connected to the body, the body comprises a fastening portion configured to fasten the fastening end, and the fastening end is rotatable relative to the fastening portion.

In one embodiment, the connecting component comprises at least two sub-connecting members, and the at least two sub-connecting members are relatively movable.

In one embodiment, the connecting structure comprises a holding portion configured to fasten the working head.

In one embodiment, the holding portion comprises an automatic holding portion configured to be automatically connected to the working head.

In one embodiment, the automatic holding portion comprises at least one of an electromagnetic clamp and an electromagnetic lock.

In one embodiment, the holding portion comprises a non-automatic holding portion configured to be non-automatically connected to the working head.

In one embodiment, the holding portion comprises at least two jaws, and the at least two jaws are movable away from or toward each other.

In one embodiment, the holding portion comprises a buckle.

In one embodiment, the connecting structure further comprises an electrical connecting member configured to be electrically connected to the working head.

In one embodiment, the self-moving device further comprises a recognition module configured to recognize the working head.

In one embodiment, the self-moving device further comprises a position detection module configured to detect the position of the connecting arm, and the control module controls a movement trajectory of the connecting arm according to a detection result of the position detection module.

In one embodiment, the self-moving device further comprises an accommodating cavity configured to accommodate the working head.

In one embodiment, the accommodating cavity comprises at least two sub-accommodating cavities configured to accommodate the different working heads.

In one embodiment, the control module controls the connecting arm to automatically extend into the accommodating cavity to be connected to the working head.

In one embodiment, the self-moving device comprises at least two connecting arms.

In one embodiment, the self-moving device further comprises a protection module configured to protect the safety of the working head.

In one embodiment, the protection module comprises a protective cover disposed on the connecting arm.

In one embodiment, the protection module comprises a safety detection module configured to detect whether the self-moving device is in a safe working environment, and the control module controls working statuses of the self-moving device and/or the working head according to a detection result of the safety detection module.

In one embodiment, the safety detection module comprises at least one of an infrared detection module, an ultrasonic detection module, and an image detection module.

In one embodiment, the protection module comprises a signal receiving module configured to receive a working signal indicating whether the working head is in a safe working environment, and the control module controls working statuses of the self-moving device and/or the working head according to the working signal.

In one embodiment, the working signal is a wireless signal generated from an operation of a user.

In one embodiment, when the signal receiving module keeps receiving a working signal indicating that the working head is in a safe working environment, the control module controls the self-moving device and/or the working head to work, and when the signal receiving module fails to receive the working signal indicating that the working head is in a safe working environment or when the signal receiving module receives a working signal indicating that the working head is in an unsafe working environment, the control module controls the self-moving device and/or the working head to stop working.

In one embodiment, the signal receiving module further comprises a signal strength detection module configured to detect the signal strength of the working signal, a signal strength threshold is preset, when the signal strength detection module detects that the signal strength of the working signal is less than the signal strength threshold, the control module controls the self-moving device and/or the working head to stop working.

In one embodiment, the working signal comprises a stop signal, and when the signal receiving module receives the stop signal, the control module controls the self-moving device and/or the working head according to the stop signal to stop working.

In one embodiment, the self-moving device comprises a plurality of preset working modes, and the control module controls the self-moving device to perform a work task according to a preset working mode.

In one embodiment, in the preset working mode, the control module controls the self-moving device to walk according to a preset path.

In one embodiment, the self-moving device further comprises a recognition module configured to recognize the working head and acquire working head information, and the control module controls the self-moving device and/or the working head according to the working head information acquired by the recognition module to perform a work task according to a corresponding preset working mode.

In one embodiment, the self-moving device further comprises a signal receiving module configured to receive an indication signal, and the control module controls working statuses of the self-moving device and/or the working head according to the indication signal.

In one embodiment, the plurality of preset working modes comprise a specified working mode, the indication signal comprises a signal indicating the specified working mode, and the control module controls the self-moving device and/or the working head according to the indication signal to perform a work task according to the specified working mode.

In one embodiment, the indication signal comprises a working signal indicating whether the working head is in a safe working environment, and the control module controls working statuses of the self-moving device and/or the working head according to the working signal.

In one embodiment, the indication signal is a wireless signal generated from an operation of a user.

In one embodiment, when the signal receiving module keeps receiving a working signal indicating that the working head is in a safe working environment, the control module controls the self-moving device and/or the working head to work, and when the signal receiving module fails to receive the working signal indicating that the working head is in a safe working environment or when the signal receiving module receives a working signal indicating that the working head is in an unsafe working environment, the control module controls the self-moving device and/or the working head to stop working.

In one embodiment, the signal receiving module further comprises a signal strength detection module configured to detect the strength of the indication signal, a signal strength threshold is preset, and when the signal strength detection module detects that the signal strength of the indication signal is less than the preset signal strength threshold, the control module controls the self-moving device and/or the working head to stop working.

In one embodiment, the indication signal comprises a stop signal, and when the signal receiving module receives the stop signal, the control module controls the self-moving device and/or the working head according to the stop signal to stop working.

In one embodiment, the self-moving device further comprises an energy module configured to supply energy to the self-moving device and/or the working head.

In one embodiment, the self-moving device comprises a return charging mode, and in the return charging mode, the control module controls the self-moving device to automatically return to a charging station to perform charging.

In one embodiment, an electric power threshold is preset, and when the electric power of an energy module is less than the electric power threshold, the control module controls the self-moving device to automatically return to the charging station to perform charging.

In one embodiment, the self-moving device further comprises a power module configured to supply power to the self-moving device.

In one embodiment, the self-moving device further comprises a working module configured to perform a preset work task, and the working module is disposed on the body.

In one embodiment, the self-moving device is an autonomous lawnmower, and the working module is a mowing head configured to perform a mowing task.

The following technical solution may further be adopted in the present embodiment:

An automatic working system, the automatic working system comprises the self-moving device according above, and the automatic working system further comprises a working head configured to be connected to a connecting arm to perform a work task.

In one embodiment, the working head comprises a connecting portion configured to be connected to a connecting structure.

In one embodiment, the working head further comprises a working head energy module configured to supply energy to the working head and/or the self-moving device.

In one embodiment, the working head further comprises a working head power module configured to supply power to the working head.

In one embodiment, the working head further comprises an information supply module configured to supply recognition information.

In one embodiment, the working head further comprises a controller configured to control working statuses of the self-moving device and/or the working head.

In one embodiment, the working head is at least one of a mowing head, a blowing-sucking apparatus, a cutting apparatus, a pair of pruning shears, a trimming head, and a pick-up apparatus.

In one embodiment, the automatic working system comprises at least two working heads that perform different work tasks, and the connecting arm is selectively connected to at least one working head.

In one embodiment, the automatic working system further comprises a controller configured to control working statuses of the self-moving device and/or the working head.

In one embodiment, the automatic working system further comprises a protection module for safety protection of the working head.

In one embodiment, the protection module is disposed on the self-moving device and/or the working head.

In one embodiment, the protection module comprises a protective cover disposed on the working head.

In one embodiment, the protection module comprises a safety detection module configured to detect whether the self-moving device is in a safe working environment, and a control module controls working statuses of the self-moving device and/or the working head according to a detection result of the safety detection module.

In one embodiment, the safety detection module comprises at least one of an infrared detection module, an ultrasonic detection module, and an image detection module.

In one embodiment, the protection module comprises a signal receiving module configured to receive a working signal indicating whether the working head is in a safe working environment, and a control module controls working statuses of the self-moving device and/or the working head according to the working signal.

In one embodiment, the automatic working system further comprises a signal sending module configured to send the working signal indicating whether the working head is in a safe working environment.

In one embodiment, the automatic working system further comprises a user terminal, and the signal sending module is disposed in the user terminal.

In one embodiment, the automatic working system further comprises a charging station configured to charge the self-moving device.

In the present embodiment, a connecting arm configured to be connected to a working head is disposed on a self-moving device to integrate various functions on the self-moving device, thereby saving a storage space for a user and reducing costs.

The following technical solution may further be adopted in the present embodiment:

A self-moving device on which a working head can be mounted includes:

a self-moving device body;

a walking mechanism, mounted on the self-moving device body to drive the self-moving device body to move;

a connecting arm, one end of the connecting arm being rotatably mounted on the self-moving device body, and the other end extending toward a side away from the self-moving device body and being provided with a connecting structure configured to mount the working head; and a control module, electrically connected to the connecting arm to control a working status of the connecting arm.

In one embodiment, an accommodating cavity is provided inside the self-moving device body, and the connecting arm is controllable by the control module to extend into the accommodating cavity.

In one embodiment, the accommodating cavity includes a plurality of sub-accommodating cavities, and the connecting arm is controllable by the control module to alternately extend into the sub-accommodating cavity.

In one embodiment, the self-moving device includes two or more connecting arms, and the two or more connecting arms are separately mounted on the self-moving device body.

In one embodiment, the connecting structure includes two or more jaws, and the two or more jaws are movable away from or toward each other.

In one embodiment, the connecting structure is a buckle.

In one embodiment, the connecting structure further includes a first electrical connecting member, and the first electrical connecting member is configured to be electrically connected to the working head.

The following technical solution may further be adopted in the present embodiment: An automatic system includes the foregoing self-moving device.

In one embodiment, the automatic system further includes a working head, there are a plurality of working heads, and the plurality of working heads selectively fit a connecting structure to be mounted on the connecting arm.

In one embodiment, the working head is a blowing-sucking apparatus, a cutting apparatus, a pair of pruning shears or a trimming head.

In the present embodiment, a connecting arm configured to be connected to a working head is disposed on a self-moving device to integrate various functions on the self-moving device, thereby saving a storage space for a user and reducing costs.

DETAILED DESCRIPTION

To make the present embodiments more comprehensible, the present embodiments are described more comprehensively below with reference to related accompanying drawings. Some embodiments of the present invention are provided in the accompanying drawings. However, the present embodiments may be implemented in various forms, and is not limited to the embodiments described herein. In contrast, these embodiments are provided for more thorough and comprehensive understanding of disclosed content of the present invention.

It should be noted that when an element is "fastened" on another element, the element may be directly fastened on the other element or an intervening element may be present. When an element is "connected" to another element, the element may be directly connected to the other element or an intervening element may be present. The terms "vertical," "horizontal," "left," "right," and similar expressions used in this specification are only used to facilitate description.

Unless otherwise defined, all technical terms and scientific terms used herein have the same meaning as commonly understood by a person skilled in the art to which the present invention belongs. The terms used herein of the present invention are merely used to describe specific embodiments but are not used to limit the present invention. The term "and/or" used in this specification includes any or all combinations of one or more listed items.

Figure 1:
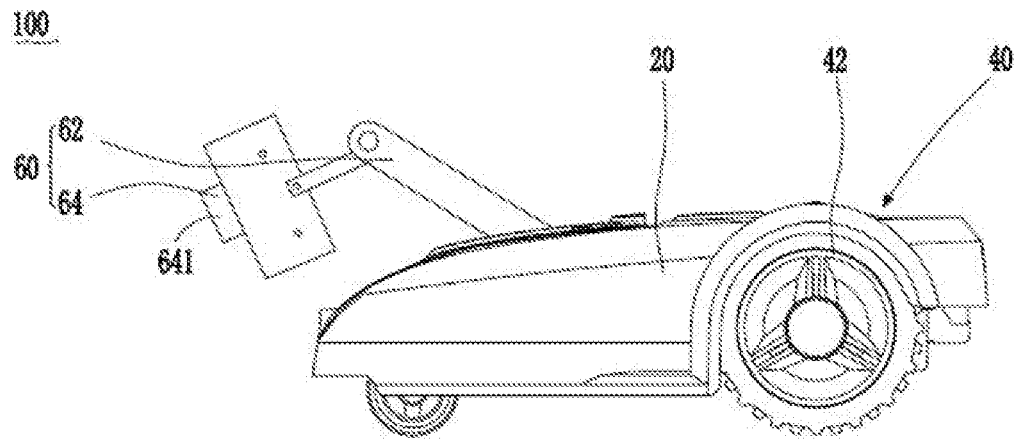
FIG. 1 is a schematic structural diagram of a self-moving device in a specific implementation.
Figure 2:
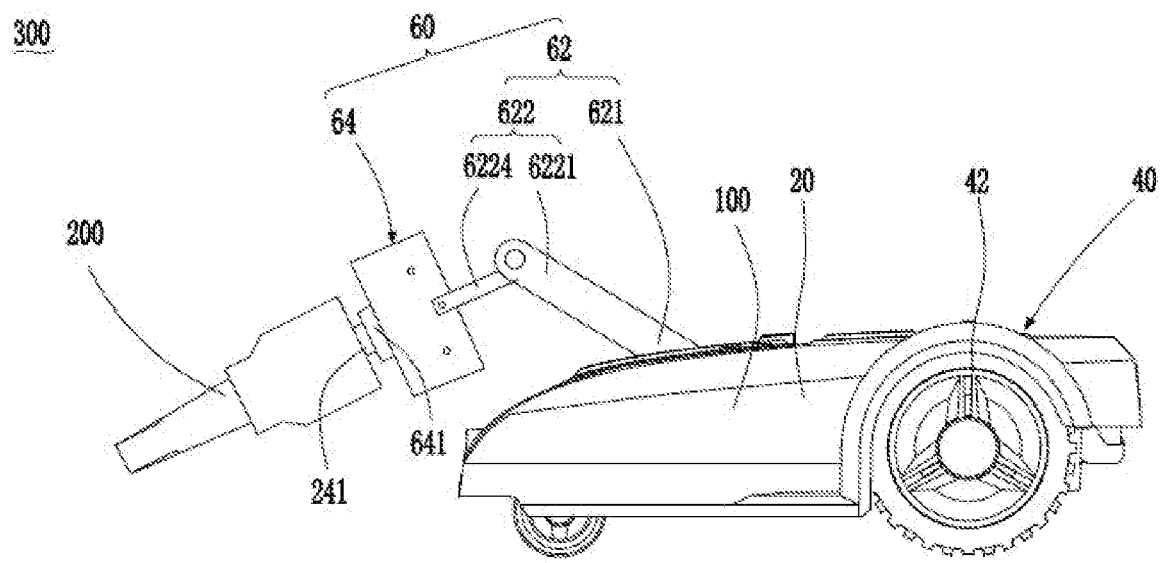
FIG. 2 is a schematic structural diagram of an automatic working system mounted with a blowing-sucking apparatus in a specific implementation.
Figure 3:
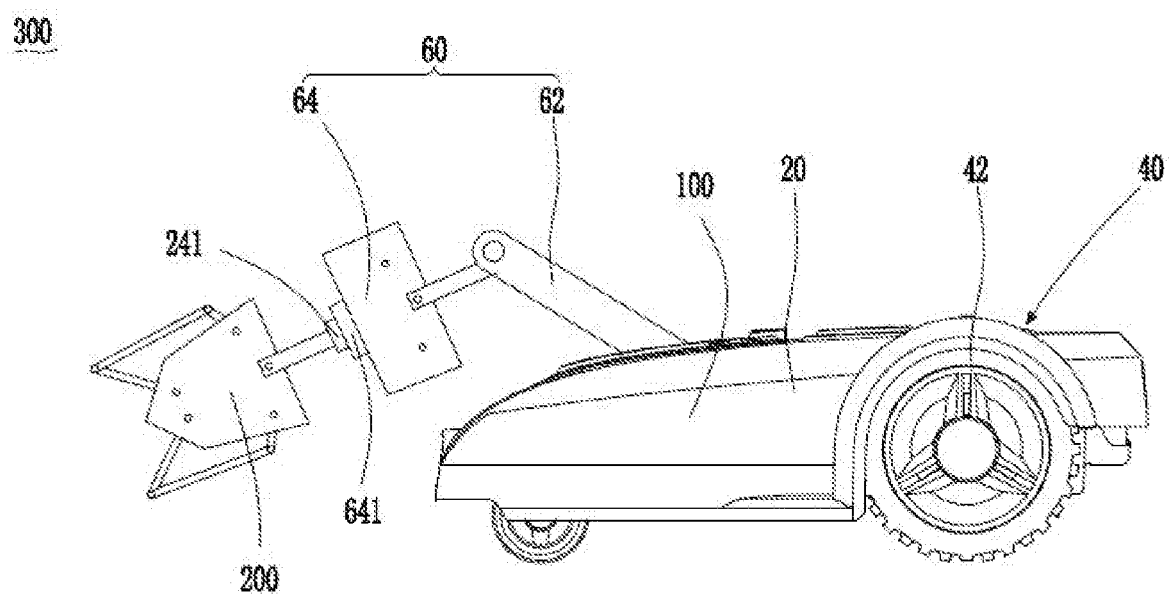
FIG. 3 is a schematic structural diagram of an automatic working system mounted with a pick-up apparatus in a specific implementation.
Figure 14:
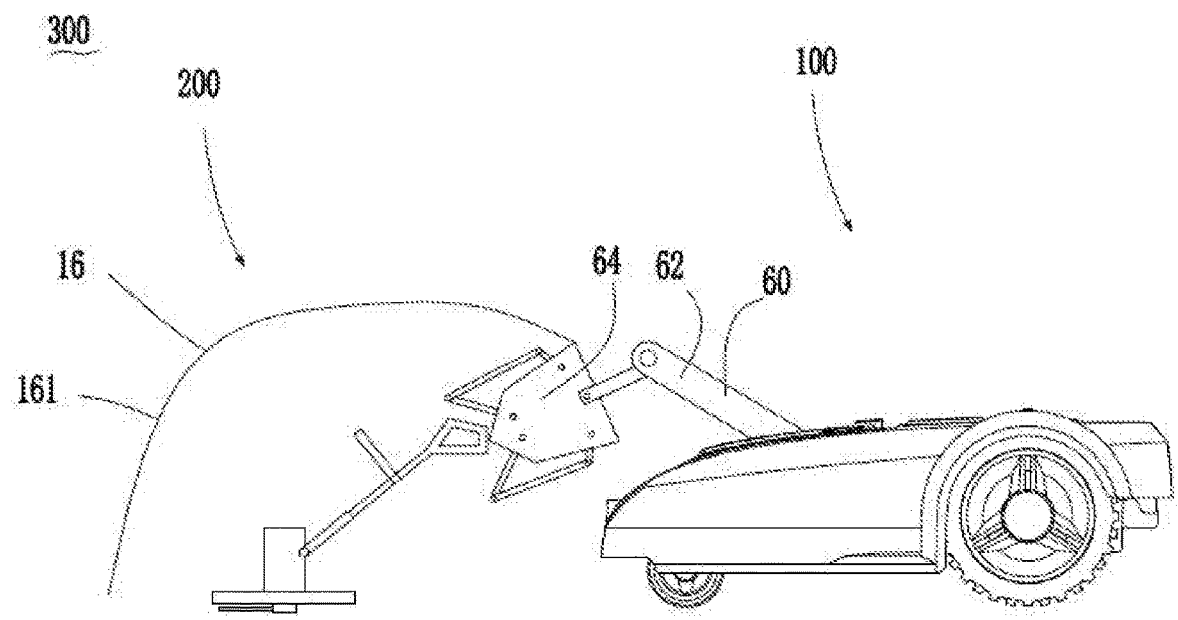
FIG. 14 is a schematic structural diagram of an automatic working system having a protective cover in a specific implementation.

As shown in FIG. 1 and FIG. 14, an automatic working system 300 includes a self-moving device 100 and a working head 200 connected to the self-moving device 100. As shown in FIG. 1 to FIG. 3, the self-moving device 100 includes a body 20, a walking mechanism 40 disposed on the body 20 and configured to drive the self-moving device 100 to walk, a connecting arm 60 connected to the body 20, a control module 11 configured to control the self-moving device 100 to walk and work within a defined area, and an energy module 13 supplying energy to the self-moving device 100. The control module 11 controls the walking mechanism 40 to drive the self-moving device 100 to walk within the defined area.

The connecting arm 60 is selectively connected to at least one of at least two working heads 200 configured to perform different work tasks. In one embodiment, the working head 200 may be one of a mowing head, a blowing-sucking apparatus, a cutting apparatus, a pair of pruning shears, a trimming head, a pick-up apparatus, and the like that perform different work tasks. The connecting arm 60 is selectively connected to the working heads 200 that perform different work tasks, so that the automatic working system 300 performs different types of work. It may be understood that the type of the working head 200 is not limited thereto and may be set as required. The connecting arm 60 is selectively connected to the working heads 200 configured to perform different work tasks. The connection includes an active connection or a passive connection. For example, in an embodiment, the connecting arm 60 may actively select to be connected to any at least one of the different working heads 200, so that the automatic working system 300 can perform different types of work. In another embodiment, the connecting arm 60 may passively select to be connected to any at least one of the different working heads 200, so that the automatic working system 300 can perform different types of work. For example, a user selects any at least one of the different working heads 200 and mounts the selected working head 200 on the connecting arm 60, so that the automatic working system 300 can perform different types of work.

Figure 5:
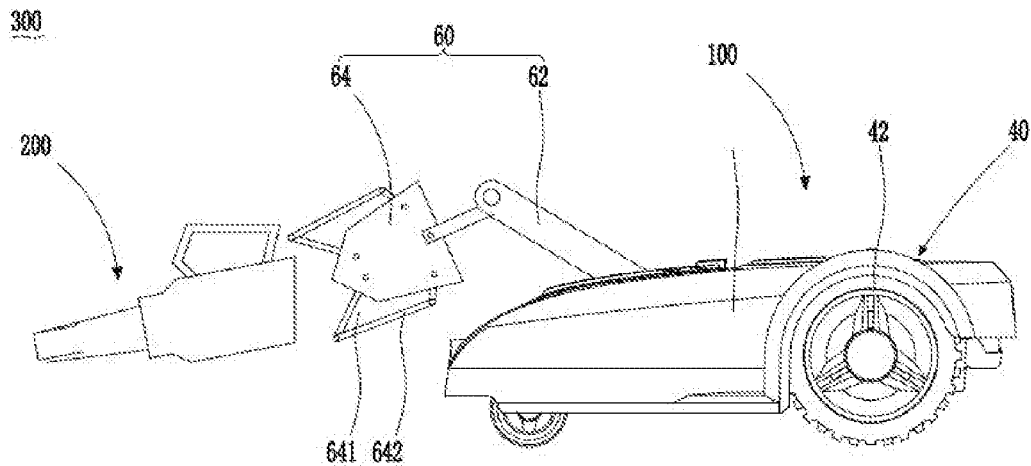
FIG. 5 is a schematic structural diagram of an automatic working system mounted with a blowing-sucking apparatus in a specific implementation.
Figure 6:
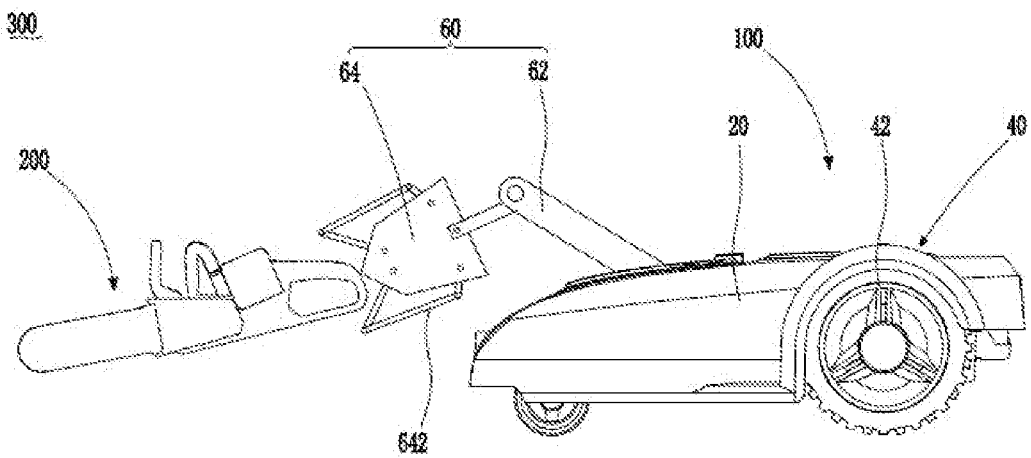
FIG. 6 is a schematic structural diagram of an automatic working system mounted with a cutting apparatus in a specific implementation.
Figure 7:
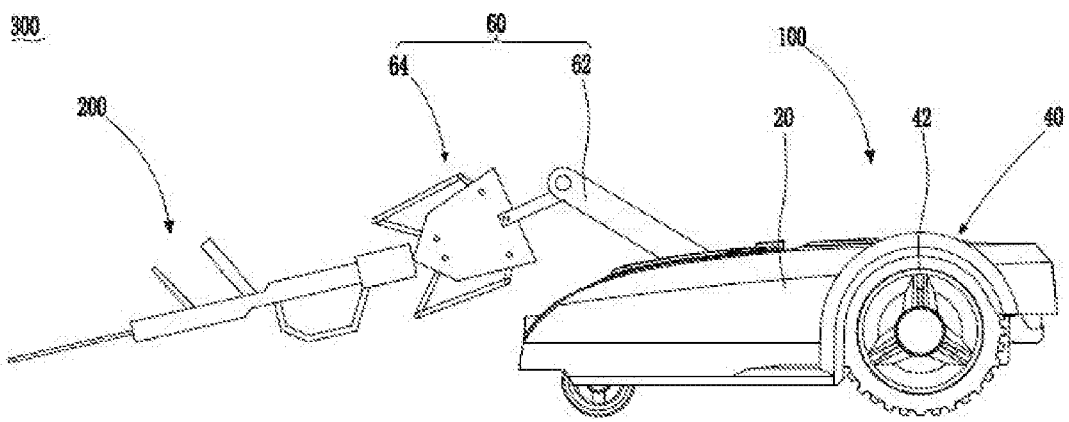
FIG. 7 is a schematic structural diagram of an automatic working system mounted with a pair of pruning shears in a specific implementation.
Figure 8:
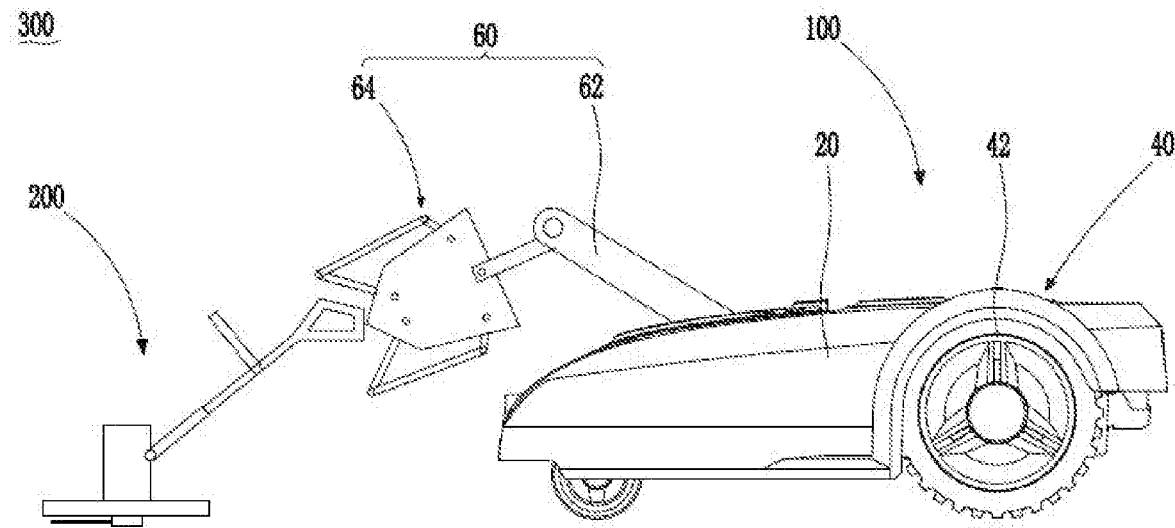
FIG. 8 is a schematic structural diagram of an automatic working system mounted with a trimming head in a specific implementation.

In one embodiment, as shown in FIG. 2 and FIG. 5, when the working head 200 connected to the connecting arm 60 is a blowing-sucking apparatus, the automatic working system 300 may be used as a blower. An air flow blown from the blowing-sucking apparatus may gather leaves or garbage scattered on the ground to facilitate collection by an operator. The automatic working system 300 may also be used as a vacuum cleaning tool to suck in dust, twigs, leaves, and the like to complete cleaning work. As shown in FIG. 3, when the working head 200 mounted on the connecting arm 60 is a pick-up apparatus, the automatic working system 300 may be used as a pick-up device. As shown in FIG. 6, when the working head 200 mounted on the connecting arm 60 is a cutting apparatus, the automatic working system 300 may be used as a cutter. In this embodiment, the cutting apparatus is a chainsaw and may be configured to cut materials such as timber. As shown in FIG. 7, when the working head 200 mounted on the connecting arm 60 is a pair of pruning shears, the automatic working system 300 can prune a plant. As shown in FIG. 8, when the working head 200 mounted on the connecting arm 60 is a trimming head, the automatic working system 300 may be used as a trimmer. The trimming head is provided with a trimming line that spins to perform trimming work.

In this embodiment, the working head 200 is detachably connected to the connecting arm 60. The "detachable" means that the working head 200 can be detached from the connecting arm 60 without a destructive operation. For example, the working head 200 is automatically detached or manually detached or detached by using an external machine. The connecting arm 60 and the working head 200 are not damaged after detachment and can be reused. The connecting arm 60 may continue to be connected to another working head 200. Certainly, the detached working head 200 can be connected again. In other embodiments, the working head 200 is nondetachably fastened on the connecting arm 60. The "nondetachable" means that the working head 200 cannot be detached from the connecting arm 60 by using a non-destructive operation. The working head 200 may be fastened on the connecting arm 60 upon delivery. Alternatively, after delivery, the user may select the working head 200 and nondetachably fasten the working head 200 on the connecting arm 60.

In this embodiment, the working head 200 is detachably connected to the connecting arm 60, to enable the connecting arm 60 to be cyclically connected to the different working heads 200, so that the automatic working system 300 can cyclically perform different types of work.

In the automatic working system 300, the connecting arm 60 is connected to the detachable working head 200. The automatic working system 300 includes a plurality of (including one) working heads 200. In an embodiment, the automatic working system 300 includes at least two working heads. The connecting arm 60 is selectively connected to the different working heads 200 to perform different types of work, so as to satisfy different environments and requirements to bring people great convenience. Because the different working heads 200 may share one self-moving device 100 instead of needing to use different self-moving devices 100, the use costs are reduced while the working efficiency is improved.

In an embodiment, the control module 11 is configured to control working statuses of the connecting arm 60 and/or the working head 200. The working status of the connecting arm 60 means whether the connecting arm 60 is working, whether the connecting arm 60 moves, a movement status of the connecting arm 60, a posture of the connecting arm 60, and the like. The working status of the working head 200 means whether the working head 200 is working, a working voltage and a working current of the working head 200, the power of the working head 200, and the like. It may be understood that the working statuses of the connecting arm 60 and/or the working head are not limited to the foregoing content. Any status, parameter, position, posture or the like related to the work of the connecting arm 60 and/or the working head 200 is referred to as a working status thereof. In another embodiment, the self-moving device 100 may control the working statuses of the connecting arm 60 and/or the working head 200 through manual control or by using another controller.

In a specific embodiment, the control module 11 may control the working statuses of the self-moving device 100 and/or the working head 200. The working status of the self-moving device 100 includes a working status of the body 20 and the working status of the connecting arm 60 of the self-moving device 100. In one embodiment, the working status of the body 20 is a working status of a part other than the connecting arm 60 of the self-moving device 100. That is, the control module 11 not only can control the working status of the connecting arm 60, but also can control the working status of the part other than the connecting arm 60 of the self-moving device 100. The working status includes whether the connecting arm 60 or the part is working, a working status of the connecting arm 60 or the part, various parameters of the connecting arm 60 or the part, and the like. In one embodiment, the control module 11 may control a walking status of the self-moving device. The walking status includes whether the self-moving device is walking, a walking speed of the self-moving device, a walking trajectory of the self-moving device, and the like. Certainly, the control module 11 may further control a status of a structure other than a walking structure, for example, a working status of another working component, or a current, a voltage, a power, charging and discharging management, return charging or the like of the self-moving device 100.

In an embodiment, the self-moving device 100 further includes a working module 12 configured to perform a preset work task. The control module 11 may control a working status of the working module 12. The working module 12 is different from the working head 200. The working module 12 is directly disposed on the body 20 and is configured to perform the most fundamental work task preset by the self-moving device 100. In a specific embodiment, the working module 12 cannot be replaced with another type of working module 12. Certainly, in other embodiments, the working module 12 may be replaced with another type of working module 12 according to an actual case. The working head 200 connected to the connecting arm 60 is configured to perform another work task corresponding to the working head 200. The working head 200 and the working module 12 may be controlled according to an actual case to work simultaneously or nonsimultaneously. In an embodiment, the work task performed by the working head 200 is different from a preset work task performed by the working module 12. The working head 200 and the working module 12 may separately perform different work tasks to implement the integration of various functions on the self-moving device 100, thereby implementing full intelligence and reducing costs, so that a user no longer needs to use hands and does not need to purchase a number of intelligent products to occupy the user's storage space. In one case, the self-moving device 100 may make the working module 12 and the working head 200 work simultaneously to improve working efficiency and shorten a working time. In the foregoing embodiment, the working head 200 and the working module 12 performing different work tasks means that tasks performed by the working head 200 and the working module 12 have different objectives but does not mean that the working head 200 and the working module 12 are necessarily different types of apparatuses. For example, in an embodiment, the working head 200 and the working module 12 are both cutting apparatuses. The working module 12 is configured to cut grass below a lawnmower, whereas the working head 200 is configured to implement a cut-to-edge task. In the foregoing embodiment, the working head 200 and the working module 12 are both cutting apparatuses but achieve different objectives, so that it is considered that the working head 200 and the working module 12 are configured to perform different work tasks. Certainly, in another embodiment, the working head 200 may perform a work task the same as that of the working module 12 to accelerate the progress of the work task, thereby shortening a working time.

In this embodiment, the self-moving device 100 is an autonomous lawnmower. The working module 12 of the self-moving device 100 includes a mowing head performing a cutting task. In one embodiment, the working module 12 is disposed below the body 20. A mowing head includes a mowing disk and a blade disposed on the mowing disk. The working head 200 may be one of working apparatuses such as a cutting apparatus, a blowing-sucking apparatus, a mowing apparatus, and a pick-up apparatus that perform different work tasks. In this case, the self-moving device 100 may be used as a lawnmower while the different working heads 200 may be mounted by using the connecting arm 60 to perform different types of work, so that the use costs are reduced while the working efficiency is improved.

In another embodiment, the self-moving device 100 may have another preset working module. For example, the self-moving device 100 is a robot cleaner having a cleaning module, a snowplow having a snow removal module, a multifunctional machine having various functional modules or the like. Certainly, in other embodiments, the self-moving device 100 may be connected to only the working head 200 that performs a work task to perform a work task but does not separately have a preset working module.

In this embodiment, the walking mechanism 40 includes a drive mechanism and a plurality of walking wheels 42 mounted on the drive mechanism. The plurality of walking wheels 42 are mounted on the body 20 and configured to drive the body 20 to move. In one embodiment, in an embodiment, the walking mechanism 40 includes two drive wheels and one driven wheel. The two drive wheels are symmetrically disposed on two sides at one end of the body 20, and the driven wheel is disposed in the middle at the other end of the body 20. Certainly, in other embodiments, the quantities and positions of the drive wheels and the driven wheel are set according to an actual case. For example, two drive wheels and two driven wheels are disposed. In this way, the drive wheels and the driven wheels fit each other to drive the body 20 to stably move. It may be understood that the structure of the walking mechanism 40 is not limited thereto. The walking mechanism 40 may include a track structure to drive the body 20 to move.

In an embodiment, the connecting arm 60 in the self-moving device 100 is connected to the body 20 and is movable relative to the body 20. That is, the connecting arm 60 is movably connected to the body 20 to implement posture adjustment of the connecting arm 60. In a specific embodiment, at least one quantity of the height, angle, position, and the like of the connecting arm 60 may be adjusted to change the posture of the connecting arm 60, to adapt to different scenarios. In a specific embodiment, for example, the connecting arm 60 may use a motor to control a joint movement to implement a posture change thereof or use an electric push rod to make an adjustment to implement a posture change thereof or use manual intervention to implement a posture change thereof. The foregoing specific manner of implementing a change in the posture of the connecting arm 60 is only an example. In other embodiments, another manner may be used, provided that the change in the posture of the connecting arm 60 can be implemented. The self-moving device 100 may conveniently and rapidly switch between working statuses according to the different mounted working heads 200, so that use costs are relatively low, working efficiency is relatively high, and people's different requirements are satisfied. In a specific embodiment, the connecting arm 60 may be controlled by the control module 11 to autonomously move, to adapt to different scenarios.

In another embodiment, an extension range of the connecting arm 60 of the self-moving device 100 exceeds a range covered by a projection of the body 20 in a horizontal direction or a vertical direction. The extension range of the connecting arm 60 is a maximum coverage range of the connecting arm 60 during working. In this embodiment, the connecting arm 60 is added and the extension range of the connecting arm 60 exceeds the range covered by the projection of the body 20 in the horizontal direction or the vertical direction, so that the connecting arm 60 is used to expand the range of the working area of the working head 200. Therefore, the range of the working area of the working head 200 exceeds the range defined by the projection of the body 20 in the horizontal direction or the vertical direction, so as to use the working head 200 to complete work that cannot be completed by the working head directly disposed on the body 20. For example, the extension range of the connecting arm 60 in the horizontal direction exceeds the range covered by the projection of the body 20 in the horizontal direction or the extension range of the connecting arm 60 in the vertical direction exceeds the range covered by the projection of the body 20 in the vertical direction, to complete work tasks in working areas located on two sides of the body 20, in front of and behind the body 20, and above and below the body 20, to avoid the deficiency that a conventional body 20 cannot work in an unreachable position. In this embodiment, the extension range of the connecting arm 60 exceeds the range covered by the projection of the body 20 in the horizontal direction, to enable the range of the working area of the working head 200 to exceed the range defined by the projection of the body 20 in the horizontal direction, so that the working head 200 can perform work in an unreachable working range of the body 20. The work is, for example, cutting to an edge, trimming, pruning or blowing leaves.

In another embodiment, the embodiment in which the connecting arm 60 is connected to the body 20 and is movable relative to the body 20 and the embodiment in which the extension range of the connecting arm 60 exceeds the range covered by the projection of the body 20 in the horizontal direction or the vertical direction may be combined. That is, the connecting arm 60 is connected to the body 20 and is movable relative to the body 20, and the extension range of the connecting arm 60 also exceeds the range covered by the projection of the body 20 in the horizontal direction or the vertical direction. The connecting arm 60 may adjust a status of the connecting arm 60 according to a specific scenario. For example, when the connecting arm 60 needs to work, the connecting arm 60 is adjusted to extend out of the body 20 to complete a work task in an unreachable position of the body 20. When the connecting arm 60 does not need to work, the connecting arm 60 is adjusted to retract within a particular range away from the body 20, to avoid that the connecting arm 60 extends excessively outward to hit a pedestrian, an obstacle, a building or the like. In one embodiment, when the range of the working area of the working head 200 needs to be adjusted, the coverage range of the connecting arm 60 is adjusted to adjust the working range of the working head 200. Certainly, the foregoing specific scenarios are only examples. A specific movable form of the connecting arm 60 may be set according to a specific case. In this embodiment, the extension range of the connecting arm 60 exceeds the range covered by the projection of the body 20 in the transverse direction or longitudinal direction, thereby expanding the range of the working area of the working head 200. In one embodiment, the connecting arm 60 is movable, so that the connecting arm 60 is adjustable, and the range of the working area of the working head 200 is adjustable.

In this embodiment, the connecting arm 60 includes a connecting structure 64 configured to be connected to the working head 200 that performs a work task and a connecting component 62 configured to connect the connecting structure 64 to the body 20. The self-moving device 100 may enable the connecting arm 60 to be connected to the working head 200 to perform different operations such as cutting, blowing-sucking, mowing, pick-up, and grabbing.

As shown in FIG. 1 to FIG. 3, the connecting structure 64 is configured to be connected to the working head 200 that performs a work task. The connecting structure 64 includes a holding portion 641 configured to fasten the working head 200. The working head 200 includes a connecting portion 241 configured to be connected to the holding portion 641 of the connecting structure 64. In this embodiment, the working head 200 is detachably fastened on the connecting structure 64. The "detachable" means that the working head 200 can be detached from the connecting structure 64 without a destructive operation. For example, the working head 200 is automatically detached or manually detached or detached by using an external machine. The connecting structure 64 and the working head 200 are not damaged after detachment and can be reused. The connecting structure 64 may continue to be connected to another working head 200. Certainly, the detached working head 200 can be connected again. In another embodiment, the working head 200 is nondetachably fastened on the connecting structure 64. The "nondetachable" means that the working head 200 cannot be detached from the connecting structure 64 by using a non-destructive operation. The working head 200 may be fastened on the connecting structure 64 upon delivery. Alternatively, after delivery, a user may select the working head 200 and nondetachably fasten the working head 200 on the connecting structure 64.

In this embodiment, as shown in FIG. 1 to FIG. 3, the connecting structure 64 includes a holding portion 641 configured to fasten the working head 200. A specific structure of the connecting structure 64 may be set according to an actual case. The holding portion 641 may be automatically or non-automatically connected to the working head 200. For example, in an embodiment, the holding portion 641 includes an automatic holding portion configured to be automatically connected to the working head 200. In one embodiment, the automatic holding portion may be an electromagnetic clamp, an electromagnetic lock, an automatic jaw clamp or the like. The connecting structure 64 may be automatically connected to or disconnected from the working head 200 by using the automatic holding portion such as the electromagnetic clamp, the electromagnetic lock or the automatic jaw clamp, to implement that the connecting arm is automatically connected to the working head 200 to perform a work task, or is automatically disconnected from the working head to store the working head, or is automatically disconnected from the working head and is then connected to another working head 200 to change the working head 200 or the like. In another embodiment, the holding portion 641 includes a non-automatic holding portion configured to be non-automatically connected to the working head 200. For example, the non-automatic holding portion is a fastener that needs to be fastened manually or with an external machine. For the working head 200, a fastener needs to be fastened on or released from the connecting arm 60 manually or with an external machine to implement connection and disconnection between the working head 200 and the connecting arm 60.

Figure 4:
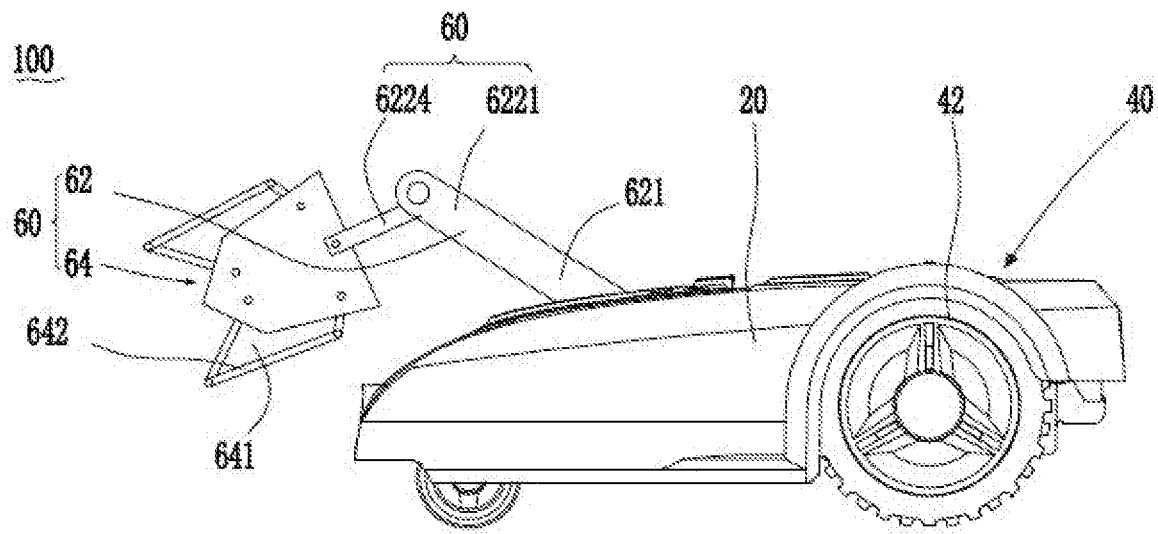
FIG. 4 is a schematic structural diagram of a self-moving device in a specific implementation.
Figure 15:
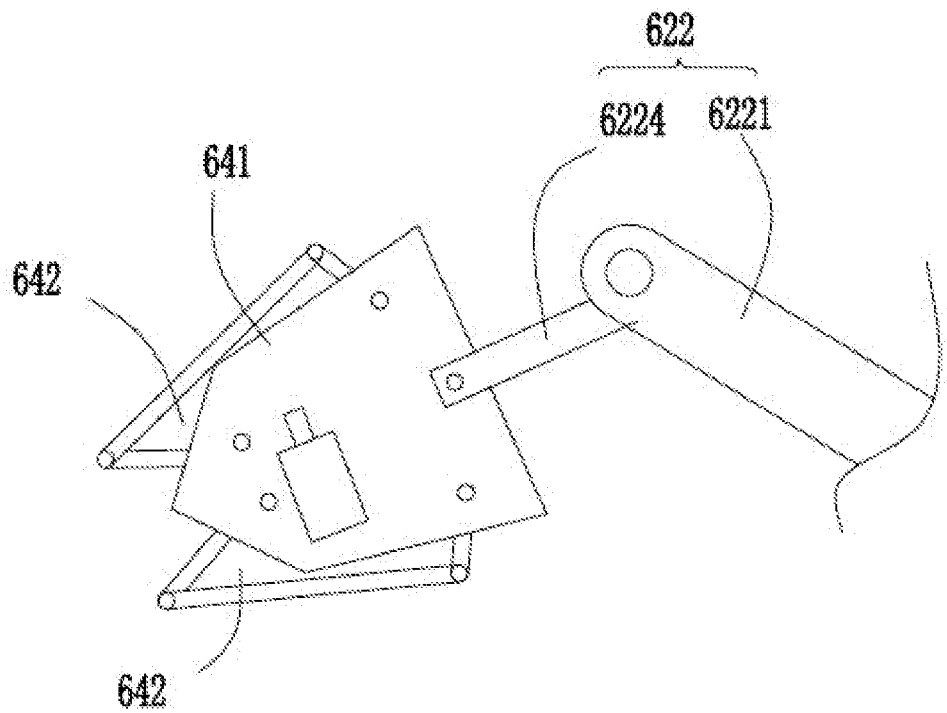
FIG. 15 is a schematic structural diagram of a connecting arm having an automatic holding portion in a released state in a specific implementation.
Figure 16:
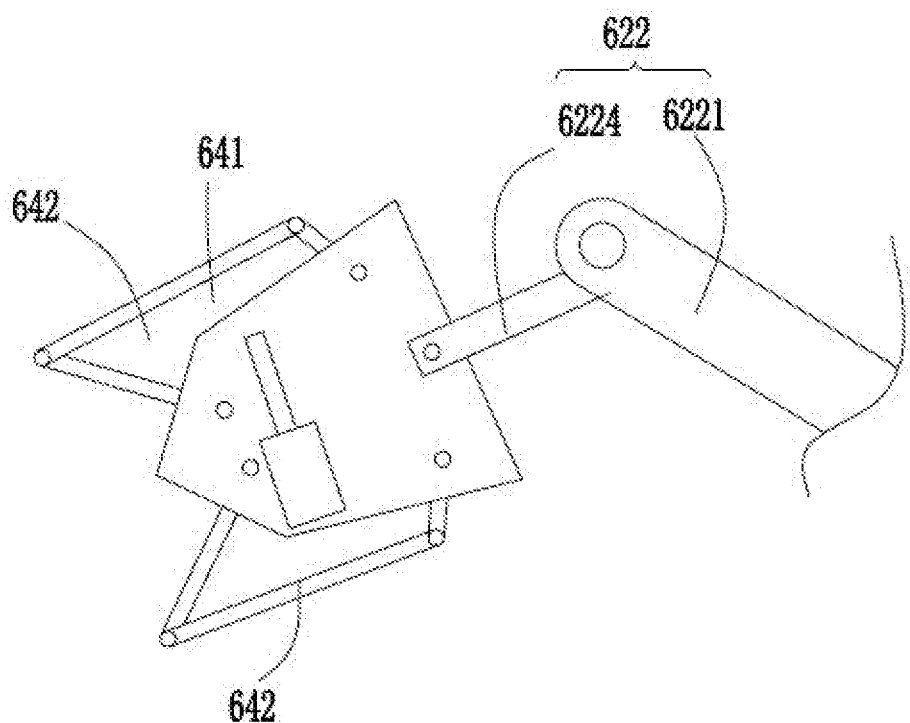
FIG. 16 is a schematic structural diagram of a connecting arm having an automatic holding portion in a closed state in a specific implementation.
Figure 17:
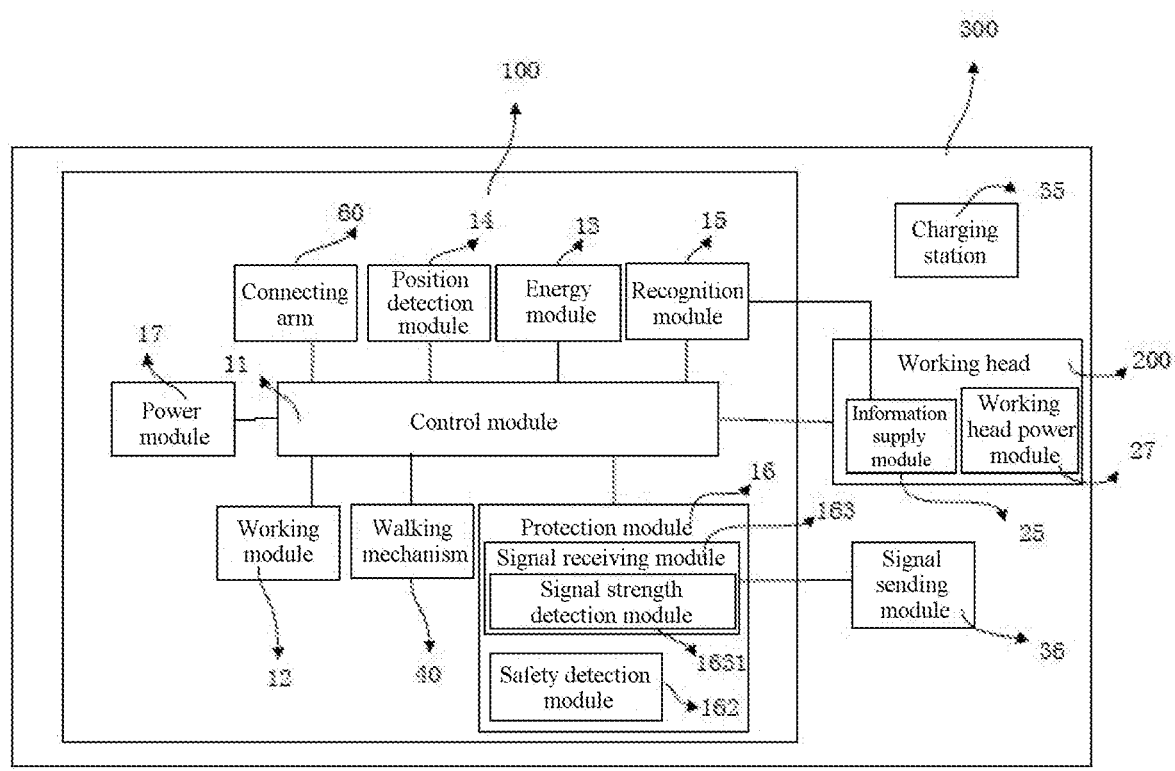
FIG. 17 is a schematic modular diagram of a self-moving device in a specific implementation.

A specific structure or form of the holding portion 641 may be set according to an actual case. For example, in an embodiment, as shown in FIG. 4 to FIG. 9, the holding portion 641 includes at least two jaws 642. The at least two jaws 642 are movable away from each other to release the working head 200 or are movable toward each other to hold the working head 200. In one embodiment, to mount the working head 200, as shown in FIG. 15, the jaws 642 are far away from each other and gradually move toward the center to hold the working head 200. To detach the working head 200, as shown in FIG. 16, the jaws 642 are close to each other and move away from each other to release the held working head 200. In this case, the connecting arm 60 may conveniently and rapidly assemble or detach the working head 200 by using the holding portion 641. It may be understood that a specific structure or form of the connecting structure 64 is not limited. In another embodiment, the holding portion 641 is a buckle. The working head 200 is provided with a gripping portion fitting the buckle. In this way, the working head 200 may be gripped on the holding portion 641 by the gripping portion to be mounted on the connecting arm 60. It may be understood that specific structures of the buckle and the gripping portion are not limited and may be set as required. In the foregoing embodiment, the holding portion 641 may use a specific structure thereof to fasten the working head 200 on the connecting arm 60, to implement connection between the working head 200 and the connecting arm 60. In other embodiments, the holding portion 641 may be used as one working head fastened on the connecting arm 60 to perform some work tasks. For example, the jaws shown in FIG. 4 are used to perform a work task such as pick-up or grabbing.

In one embodiment, the connecting structure 64 further includes a first electrical connecting member (not shown). The working head 200 includes a second electrical connecting member (not shown) fitting the first electrical connecting member to be electrically connected to the body 20. In this case, the body of the self-moving device 100 may use the first electrical connecting member and the second electrical connecting member to control a working status of the working head 200, to facilitate use of the self-moving device 100. It may be understood that a control manner of the working head 200 mounted on the body 20 is not limited thereto. The working head 200 may be electrically connected to the body 20 through a manual operation by an operator or in another connection manner.

The connecting arm 60 further includes a connecting component 62 configured to connect the connecting structure 64 to the body 20. The connecting component 62 is connected to the body 20 and is movable relative to the body, to implement a change in the posture of the connecting arm 60. Further, the connecting component 62 is movable relative to the connecting structure 64, to provide another manner of change in the posture of the connecting arm 60. The connecting component 62 includes a fastening end 621 movably connected to the body 20. The connecting component 62 is movable relative to the body 20 in various forms, for example, parallel movement, non-parallel movement, telescopic movement or rotation, provided that the connecting component 62 and the body 20 can move relative to each other.

The body 20 includes a fastening portion (not shown) configured to fasten the fastening end 621. The fastening end 621 is connected inside the fastening portion and is movable relative to the fastening portion. In a specific embodiment, the fastening end 621 is rotatable relative to the fastening portion, to implement a change in the height, angle, position, and the like. In an embodiment, the fastening portion may be used as the rotation center. The fastening end 621 rotates around the fastening portion, to implement a change in the position of the fastening end 621. In another embodiment, the fastening end 621 may not rotate with the fastening portion as the rotation center or may not rotate or only normally rotates. In other embodiments, the fastening end 621 may implement a change in the position of the fastening end 621 through parallel movement, non-parallel movement, telescopic movement or the like instead of rotating to change the position of the fastening end 621.

In one embodiment, the connecting component 62 includes at least two sub-connecting members. The at least two sub-connecting members are relatively movable, to implement a change in the posture of the connecting arm 60. In this embodiment, as shown in FIG. 1 to FIG. 9, in this embodiment, the sub-connecting member is a connecting rod 622. Certainly, in other embodiments, the sub-connecting member may be in another form such as a hinge, a working platform or the like or may be a combination of a connecting rod, a hinge, a working platform, and the like. In this embodiment, for example, the connecting component 62 includes only two connecting rods 622. In other embodiments, the connecting component 62 may include one connecting rod 622 or more than two connecting rods 622. Generally, when there are more connecting rods 622, the posture of the connecting arm 60 changes in more manners, and the connecting arm 60 is more flexible. In this embodiment, the connecting component 62 includes a first connecting rod 6221 connected to the fastening end 621 and a second connecting rod 6224 connected to the connecting structure 64. The first connecting rod 6221 and the second connecting rod 6224 are connected and are relatively movable. In one embodiment, one end of the connecting arm 60 is connected to the body by the fastening end, and the other end is connected to the working head 200 by the connecting structure 64. The fastening end 621 moves to drive the first connecting rod 6221 to move. The first connecting rod 6221 moves to drive an end portion of the second connecting rod 6224 to move. The second connecting rod 6224 may not only move along with the first connecting rod 6221 and may also move relative to the first connecting rod 6221. The connecting structure 64 may not only move along with the second connecting rod 6224, and may also move relative to the second connecting rod 6224, to implement a change among multi-position postures, thereby implementing a change among multi-position postures of the connecting structure 64, to adapt to different scenarios, for example, working scenarios in which different work tasks are performed, a scenario of connecting or detaching a working head or the like.

In this embodiment, the self-moving device 100 further includes a position detection module 14 configured to detect the position of the connecting arm 60. The self-moving device 100 detects a specific position of the connecting arm 60 by using the position detection module 14, to control a movement trajectory of the connecting arm 60 according to the position of the connecting arm 60. In an embodiment, the position detection module 14 may be configured to detect a specific position of the connecting structure 64. The control module 11 controls the movement trajectory of the connecting arm 60 according to the position of the connecting structure 64. In one embodiment, the controlling the movement trajectory of the connecting arm 60 includes controlling a movement trajectory of the fastening end 621 relative to the body 20 and relative movement trajectories of adjacent connecting rods, to automatically adjust the position of the connecting structure 64, to enable the connecting structure 64 to adapt to different scenarios. Certainly, in other embodiments, the position detection module 14 may be configured to detect the position of another structure of the connecting arm 60, and the control module 11 controls movement trajectories of different portions of the connecting arm 60, to adjust the posture of the connecting arm 60, to enable the connecting arm 60 to adapt to different scenarios.

Figure 9:
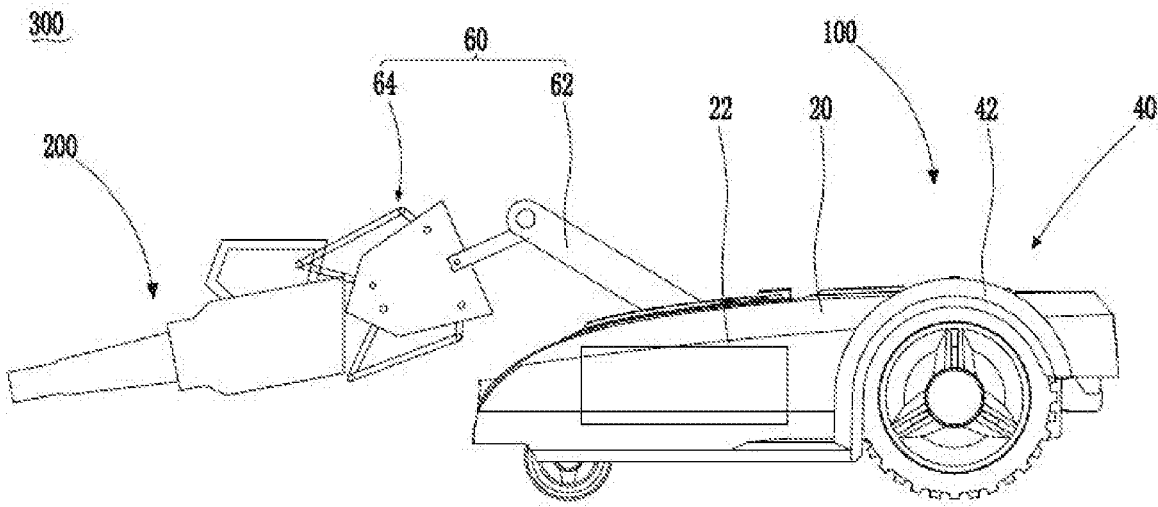
FIG. 9 is a schematic structural diagram of an automatic working system in a specific implementation.

As shown in FIG. 9, the automatic working system 300 further includes an accommodating cavity configured to accommodate the working head 200. The automatic working system 300 includes a plurality of (including one) working heads 200. The plurality of working heads 200 selectively fit the connecting structure 64 of the self-moving device 100 to be mounted on the connecting arm 60. When the automatic working system 300 does not need to be used for a long time, the working head 200 may be accommodated inside another accommodating apparatus or located inside an accommodating cavity 22 of the self-moving device 100. The working head 200 in the accommodating cavity 22 may be replaced as required to satisfy different requirements.

In one embodiment, in an embodiment, the body 20 is provided with an accommodating cavity 22 configured to accommodate the working head 200. The connecting arm 60 may be controlled by the control module 11 to extend into the accommodating cavity 22 and acquire the working head 200. In this case, the self-moving device 100 may use the accommodating cavity 22 to accommodate the plurality of working heads 200, so that the working heads 200 can be conveniently changed at any time during working. Certainly, in other embodiments, the accommodating cavity 22 may be provided in another position of the automatic working system 300, for example, provided in a position such as a base station, a charging station 35 or the like of the automatic working system 300.

In one embodiment, different types of working heads 200 are separately limited in corresponding positions in the accommodating cavity 22. When a working head needs to be assembled, detached or changed, the connecting arm 60 may be controlled by the control module 11 to extend to a position corresponding to a target working head 200 and automatically connect to the working head 200 located in the position or release the mounted working head 200 to place the working head 200 in the accommodating cavity 22. In one embodiment, the accommodating cavity 22 includes a plurality of sub-accommodating cavities provided at an interval. The plurality of working heads 200 are separately correspondingly placed inside a sub-accommodating cavity. The connecting arm 60 may be controlled by the control module 11 to acquire a corresponding working head 200 from a corresponding sub-accommodating cavity or place a corresponding working head 200 in a corresponding sub-accommodating cavity. In another embodiment, an operator may select a required working head 200 from the accommodating cavity 22 at any time and manually mount the working head 200 on the connecting arm 60.

Figure 10:
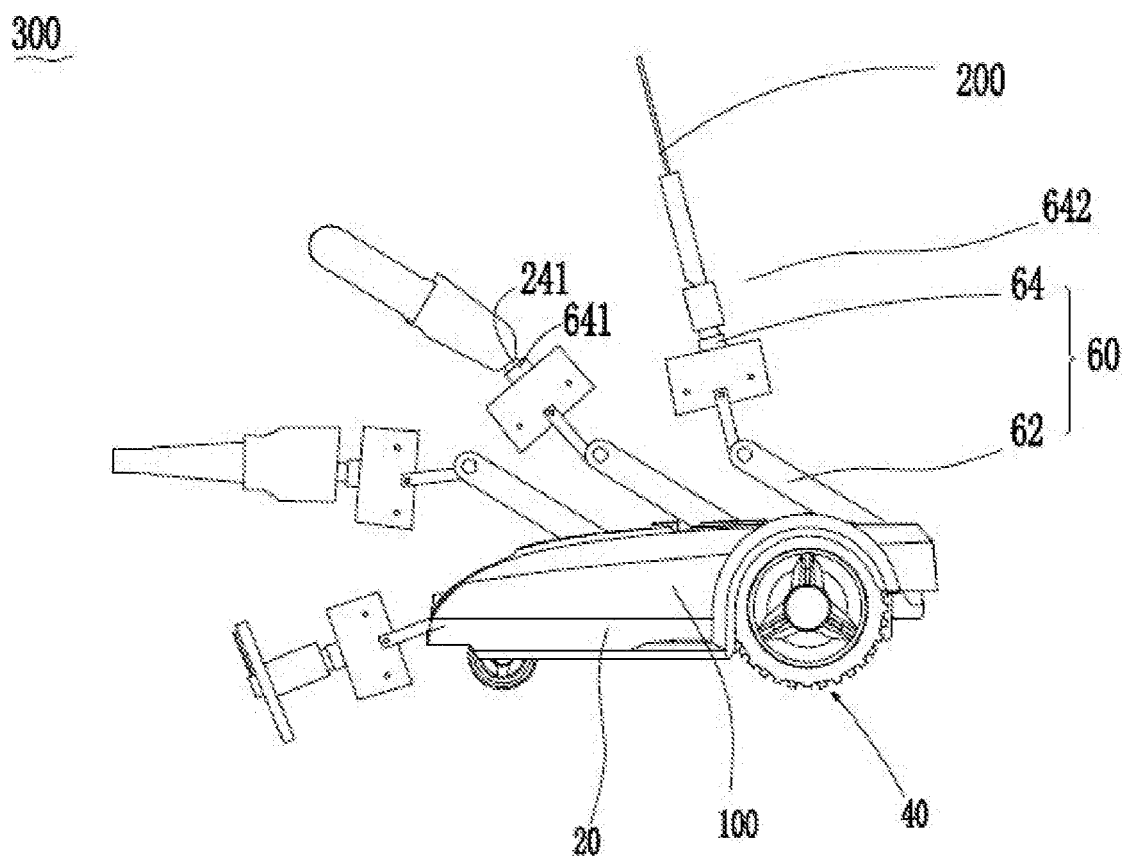
FIG. 10 is a schematic structural diagram of an automatic working system having a plurality of working heads in a specific implementation.
Figure 11:
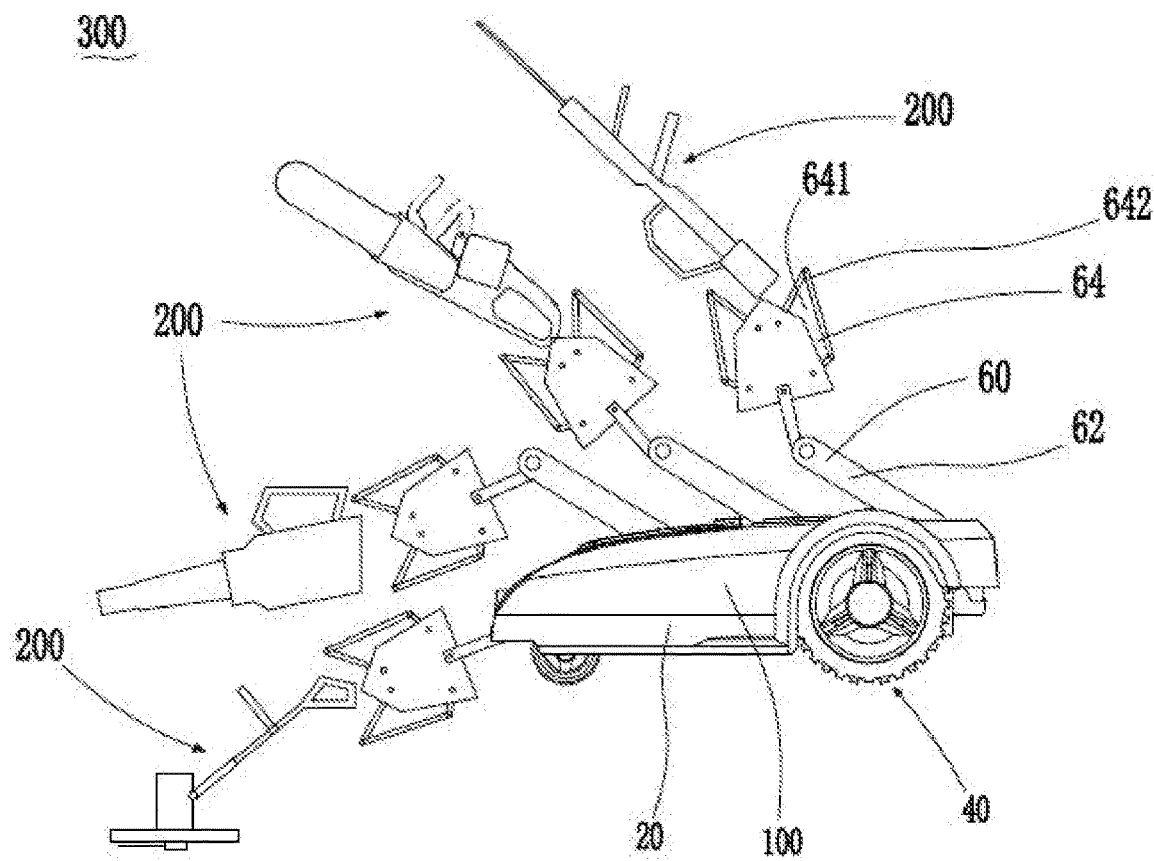
FIG. 11 is a schematic structural diagram of an automatic working system having a plurality of working heads in a specific implementation.

As shown in FIG. 10 and FIG. 11, in an embodiment, the self-moving device 100 includes two or more connecting arms 60. The two or more connecting arms 60 are separately mounted on the body 20. In this case, different working heads 200 may be mounted on different connecting arms 60 to perform different work tasks, to switch between the different connecting arms 60 and the working heads 200 more conveniently and rapidly to perform work, or different connecting arms 60 are connected to the different working heads at the same time to perform different work tasks, thereby improving working efficiency and bringing great convenience to a user. Different connecting arms 60 may be connected to same working heads 200 to control a plurality of working heads to work simultaneously, thereby improving the working efficiency. In a specific embodiment, different connecting arms 60 may be provided with different connecting structures according to actual cases to match the different working heads 200, thereby improving the universality of the connecting arm 60 and reducing costs.

The self-moving device 100 further includes a recognition module 15 configured to recognize the working head 200. When the self-moving device 100 is connected to the working head 200, in other words, when the working head 200 is connected to the connecting arm 60, the recognition module 15 automatically recognizes the working head 200 and acquires working head information. The working head information is information related to the working head, and is, for example, the type of the working head, the power of the working head or a supply voltage required for the working head. In one embodiment, the working head 200 includes an information supply module 25 configured to supply recognition information. The recognition module 15 can recognize recognition information supplied by the information supply module 25 to acquire the working head information. In one embodiment, the control module 11 controls a working status of the connecting arm 60 according to the working head information. In a specific embodiment, the self-moving device 100 may recognize the working head in the following manners. In an embodiment, a recognition electrode is added to the self-moving device 100 and is electrically connected to the working head 200. The self-moving device 100 uses the recognition electrode to recognize the working head. The recognition electrode may also be referred to as the recognition module. In another embodiment, a sensor such as a Hall sensor or a photoelectric switch sensor is used to recognize the different working heads. Sensors are mounted in different positions to recognize the different working heads. For example, a sensor corresponding to a first working head is mounted in a first position, and a sensor corresponding to a second working head is mounted in a second position, so that the sensor in the self-moving device 100 separately senses the sensor in the first or second position of the corresponding working head to recognize a tool. For example, the first tool is determined when the first position is sensed. The sensor in the self-moving device 100 may also be referred to as the recognition module 15. The sensor in the working head 200 may also be referred to as the information supply module 25. In another embodiment, reeds are used to recognize the different working heads. The self-moving device 100 is packed with magnet components. The reeds are mounted in different positions of different tools. When magnetic induction occurs, two contacts of a reed are closed, so as to recognize the different working heads. The reed may also be referred to as the recognition module. In another embodiment, a resistor is used to recognize the different working heads 200. One recognition resistor is provided inside the self-moving device 100, and one recognition resistor is provided inside the working head 200. Voltage sampling is used to recognize resistance. The different working heads 200 have different resistance, so as to detect different sampling voltages of the different working heads and determine a connected working head according to a corresponding sampling voltage. The recognition resistor may also be referred to as the recognition module. In other embodiments, the recognition module may be in another form provided that the working head information can be recognized. The foregoing embodiments are only examples for description. In the foregoing embodiments, the self-moving device 100 is separately provided with a corresponding recognition module for recognizing the working head information. In one embodiment, in an embodiment, the recognition module 15 is disposed in a position, near the working head 200, of the connecting arm 60, for example, is disposed on the connecting structure 64, so that the recognition module 15 can be as close to the working head 200 as possible to achieve optimal recognition. Certainly, in other embodiments, the recognition module 15 may be disposed in another position of the connecting arm 60 or is disposed at the body 20 of the self-moving device 100 according to an actual requirement.

Figure 12:
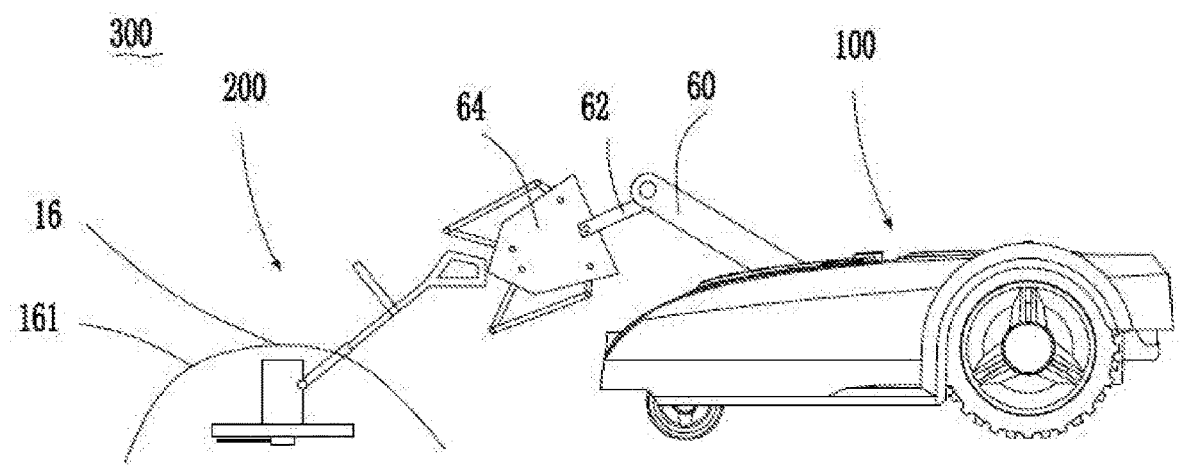
FIG. 12 is a schematic structural diagram of an automatic working system having a protective cover in a specific implementation.
Figure 13:
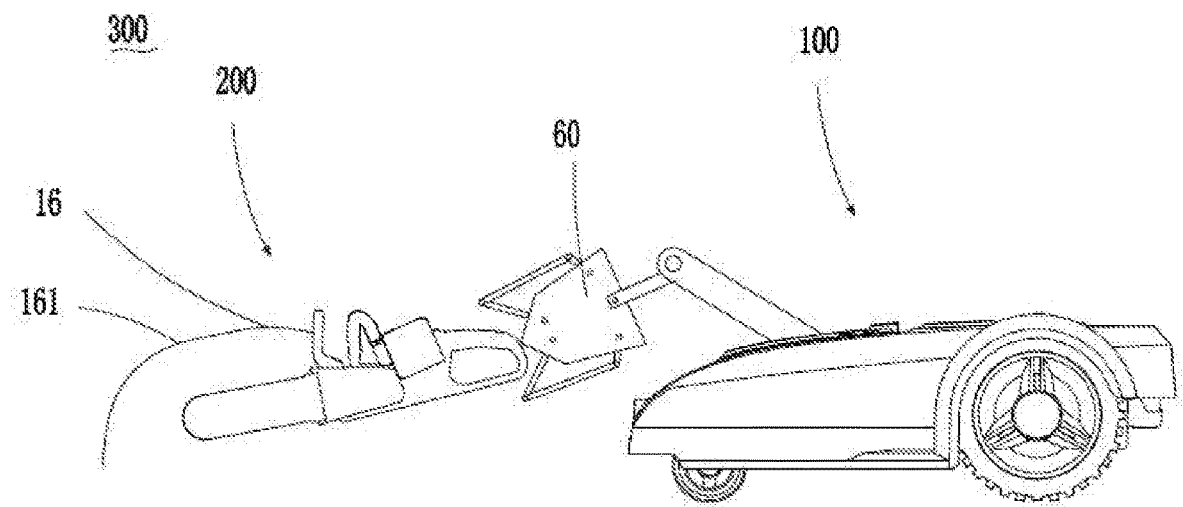
FIG. 13 is a schematic structural diagram of an automatic working system having a protective cover in a specific implementation.

As shown in FIG. 12 to FIG. 14, and FIG. 17, the automatic working system 300 further includes a protection module 16 configured to protect the safety of the working head 200. The protection module 16 may be disposed on the self-moving device 100 and/or the working head 200. Certainly, the protection module 16 may be disposed in another position of the automatic working system 300, for example, disposed in a position such as a base station, a charging station or various user terminals of the automatic working system 300. In an embodiment, as shown in FIG. 12 to FIG. 14, the protection module 16 may be a protective cover 161 configured to protect the safety of the working head 200, so that when the working head 200 is working, the protective cover 161 protects the working head 200, to prevent the working head from injuring a human or an animal or damaging another object by accident. In one embodiment, the protective cover 161 may be disposed on the working head 200 as shown in FIG. 12 and FIG. 13, or may be disposed on the self-moving device 100 as shown in FIG. 14, for example, is disposed on the connecting arm 60 of the self-moving device 100. The protective cover 161 may be fixedly disposed on the self-moving device 100 or the working head 200 or may be detachably disposed on the self-moving device 100 or the working head 200. When the protective cover 161 is detachably disposed, the protective cover 161 may be mounted for protection only during the use of a working head 200 having a safety hazard according to the type of the working head 200. The protective cover 161 may be movably disposed on the self-moving device 100. In one embodiment, the protective cover 161 includes an opening position and a closing position. The protective cover 161 is movable, so that the protective cover 161 is selectively in the opening position or the closing position.

In another embodiment, the protection module 16 includes a safety detection module 162 configured to detect whether the working head 200 is in a safe working environment and obtain a detection result. The control module 11 controls working statuses of the self-moving device 100 and/or the working head 200 according to the detection result of the safety detection module 162. The working status of the self-moving device 100 includes a working status of the body 20 and a working status of the connecting arm 60 of the self-moving device 100. In one embodiment, the working status of the body 20 is a working status of a part other than the connecting arm 60 of the self-moving device 100. That is, the control module 11 not only can control the working status of the connecting arm 60, but also can control the working status of the part other than the connecting arm 60 of the self-moving device 100. The working status includes whether the self-moving device is working, a state and various parameters of the self-moving device during working, and the like. In one embodiment, the control module 11 may control a walking status of the self-moving device. The walking status includes whether the self-moving device is walking, a walking speed of the self-moving device, a walking trajectory of the self-moving device, and the like. Certainly, the control module 11 may further control a status of a structure other than a walking structure, for example, a working status of another working component or a current, a voltage, a power, charging and discharging management or return charging of the self-moving device 100.

In one embodiment, in an embodiment, the safety detection module 162 includes at least one of an infrared detection module, an ultrasonic detection module, an image detection module, and another detection module. When the safety detection module 162 detects that the control module 11 is in an unsafe working environment, for example, when a human, an animal or another vulnerable object is nearby, the control module 11 controls the working head 200 to stop working, and/or adjusts the posture of the connecting arm 60, and/or controls the self-moving device 100 to reverse, steer or the like, to enable the working head 200 to be in a safe working environment. Certainly, the control module 11 may control the automatic working system 300 to raise an alarm to remind a user to make manual intervention. In this embodiment, the safety detection module 162 may be disposed on the self-moving device 100 and/or the working head 200. Certainly, in other embodiments, the safety detection module 162 may be disposed in another position of the automatic working system.

In another embodiment, the protection module 16 further includes a signal receiving module 163 configured to receive a working signal indicating whether the working head 200 is in a safe working environment. The control module 11 controls the working statuses of the self-moving device 100 and/or the working head 200 according to the received working signal. For example, when the signal receiving module 163 receives a working signal indicating that the working head 200 is in a safe working environment, the control module 11 controls the working head 200 to work. When the signal receiving module 163 receives a working signal indicating that the working head 200 is in an unsafe working environment, or, when the signal receiving module 163 fails to receive the working signal indicating that the working head 200 is in a safe working environment, the control module 11 controls the working head 200 to stop working, and/or adjusts the working status of the connecting arm 60, and/or controls the self-moving device 100 to reverse or turn to and the like. Certainly, the control module 11 may control the automatic working system 300 to raise an alarm to remind a user to make manual intervention. In this embodiment, the signal receiving module 163 may be disposed on the self-moving device 100 and/or the working head 200. Certainly, in other embodiments, the signal receiving module 163 may be disposed in another position of the automatic working system, for example, a position such as a charging station, a base station or various user terminals. In the foregoing embodiment, the automatic working system 300 further includes a signal sending module 36 configured to send the working signal indicating whether the working head 200 is in a safe working environment. The signal receiving module 163 receives the working signal sent by the signal sending module 36. The control module 11 controls the working statuses of the self-moving device 100 and/or the working head 200 according to the working signal received by the signal receiving module 163. In one embodiment, in this embodiment, the working signal is a wireless signal. The signal sending module 36 and the signal receiving module 163 are respectively a wireless signal sending module and a wireless signal receiving module. Certainly, in other embodiments, the working signal may be set to a wired signal according to an actual case. The signal sending module 36 and the signal receiving module 163 are respectively a wired signal sending module and a wired signal receiving module.

Figure 19:
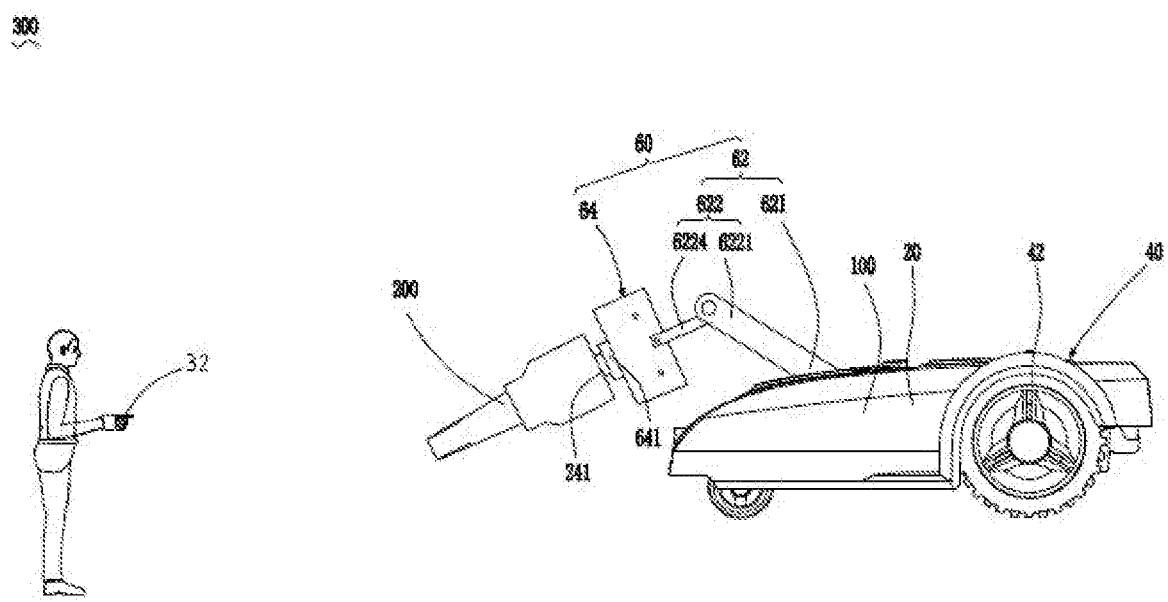
FIG. 19 is a schematic diagram of controlling a self-moving device by a user performing an operation in an automatic working system in a specific implementation.

In a specific embodiment, a user may participate to determine together whether the working head is in a safe working environment. As shown in FIG. 19, specifically, in an embodiment, the user directly determines that the working head is in a safe working environment. In one embodiment, the automatic working system 300 further includes a signal sending module configured to send the working signal indicating whether the working head is in a safe working environment 36 and a signal receiving module 163 configured to receive the working signal. In one embodiment, the working signal is a wireless signal. The signal sending module 36 and the signal receiving module 163 are respectively a wireless signal sending module and a wireless signal receiving module. The signal sending module 36 may be disposed on another user terminal 32 such as a remote control or the user's mobile phone or computer. The signal receiving module 163 may be disposed on the self-moving device 100 and/or the working head 200. In one embodiment, the automatic working system 300 sends the working signal indicating a safe working environment by using the signal sending module 36 on the user terminal 32 such as the remote control, the mobile phone or the computer. In one embodiment, the working signal is a wireless signal generated from an operation of the user. After the user determines that the working head 200 is in a safe working environment, the user triggers a safety signal sending instruction on the user terminal such as the remote control, the mobile phone or the computer. After receiving the safety signal sending instruction, the signal sending module 36 keeps sending the working signal indicating that the working head 200 is in a safe working environment. The self-moving device 100 or the working head 200 is provided with a signal receiving module 163 that receives the working signal. When the signal receiving module 163 receives the working signal indicating that the working head 200 is in a safe working environment, the control module 11 controls the working head 200 to work. When the user finds that the working head is not in a safe working environment, the user releases a safety signal sending instruction to stop sending the working signal indicating that the working head 200 is in a safe working environment, or triggers an unsafety signal sending instruction to send the working signal indicating that the working head 200 is in an unsafe working environment. In this case, the signal receiving module 163 fails to receive the working signal indicating that the working head 200 is in a safe working environment, or receives the working signal indicating that the working head 200 is in an unsafe working environment, the control module 11 controls the working head 200 according to the working signal received by the signal receiving module 163 to stop working.

In one embodiment, in another embodiment, the working signal indicating whether the working head 200 is in a safe working environment further includes a stop signal. When the signal receiving module receives the stop signal, the control module controls the self-moving device 100 and/or the working head 200 to stop working. In one embodiment, the stop signal is a wireless signal generated from an operation of a user. For example, a stop instruction is set on a user terminal such as the remote control, the mobile phone or the computer. When the user triggers the stop instruction, the user terminal sends a wireless signal indicating the stop signal, the signal receiving module receives the stop signal, and the control module controls the self-moving device 100 and/or the working head 200 to stop working.

In one embodiment, in another embodiment, a safe monitoring range is preset. A distance between a user and the self-moving device 100 is detected to determine whether the working head 200 is in a safe working environment. When the user is in the safe monitoring range, it indicates that the user is monitoring the self-moving device 100, and the user can make manual intervention to ensure safe working of the working head 200. In this case, it is determined by default that the working head 200 is in a safe working environment, and the control module 11 controls the working head to work. In contrast, when the user is outside the safe monitoring range, to avoid a dangerous situation during working of the working head 200 without supervision, in this case, it is determined by default that the working head 200 is in an unsafe working environment, and the control module 11 controls the working head 200 to stop working. In one embodiment, the distance between the user and the self-moving device 100 may be detected by using various methods in the following. For example, in an embodiment, the safety detection module may be used to directly detect a distance. The distance is detected to determine whether the working head is in a safe working environment. For example, an infrared detection module, an ultrasonic detection module, an image recognition module or the like is used to directly detect a distance. In another embodiment, signal strength or the like may be detected to indirectly detect a distance.

In one embodiment, an implementation of detecting signal strength or the like to indirectly detect a distance is as follows. The automatic working system 300 further includes a signal sending module 36 configured to send the working signal indicating whether the working head is in a safe working environment and a signal receiving module 163 configured to receive the working signal. In one embodiment, the working signal is a wireless signal generated from an operation of a user. The signal sending module 36 is located near the user. For example, the signal sending module 36 may be integrated in a user terminal such as the remote control, the mobile phone or the computer. The user triggers a signal sending instruction. The signal sending module 36 sends a signal after receiving the signal sending instruction. The signal receiving module 163 is disposed on the self-moving device 100 and/or the working head 200. The signal receiving module 163 includes a signal strength detection module 1631 detecting signal strength. The signal receiving module 163 receives and detects the strength of the signal sent by the signal sending module 36. A signal strength threshold corresponding to the safe monitoring range is preset. When the signal strength detection module 1631 detects that the signal strength is lower than the signal strength threshold, it indicates that the user exceeds the safe monitoring range. In this case, the control module 11 controls the working head 200 to stop working. When the signal strength detection module 1631 detects that the signal strength is not less than the signal strength threshold, it indicates that the user is in the safe monitoring range. In this case, the control module 11 controls the working head 200 to work.

In one embodiment, in another embodiment, the method in which a user may directly determine that the working head is in a safe working environment and the method of detecting the distance between the user and the self-moving device 100 may be combined to determine that the working head is in a safe working environment. The control module 11 controls the working head 200 to work only when it is determined in both methods that the working head 200 is in a safe working environment. If it indicates in either of the methods that the working head 200 is in an unsafe working environment, the control module 11 controls the working head 200 to stop working. In one embodiment, in an implementation, the signal sending module 36 is located near the user. For example, the signal sending module 36 may be integrated in a user terminal such as the remote control, the mobile phone or the computer. The user triggers a signal sending instruction. The signal sending module 36 sends a signal after receiving the signal sending instruction. The signal receiving module 163 is disposed on the self-moving device 100 and/or the working head 200. After the user determines that the working head 200 is in a safe working environment, the user triggers the safety signal sending instruction on the user terminal such as the remote control, the mobile phone or the computer. After receiving the safety signal sending instruction, the signal sending module 36 sends the working signal indicating that the working head 200 is in a safe working environment. The self-moving device 100 or the working head 200 is provided with the signal receiving module 163 receiving the working signal. The signal receiving module 163 includes a signal strength detection module 1631 configured to detect the working signal strength. A signal strength threshold corresponding to the safe monitoring range is preset. When the signal receiving module 163 receives the working signal indicating that the working head 200 is in a safe working environment, and the signal strength detection module 1631 detects that the strength of the working signal is not less than the signal strength threshold, it indicates that the user is in the safe monitoring range, and it is determined that the working head 200 is in a safe working environment. In this case, the control module 11 controls the working head 200 to work. In contrast, if the signal receiving module 163 fails to receive the working signal indicating that the working head 200 is in a safe working environment, the strength of the received working signal is less than the signal strength threshold or the working signal indicating that the working head 200 is in an unsafe working environment is received, it is determined that the working head is in an unsafe working environment. In this case, the control module 11 controls the working head 200 to stop working.

In a specific embodiment, the self-moving device 100 further includes a plurality of (including one) preset working modes. For example, the self-moving device 100 includes a blowing-sucking mode, a cutting mode, a pruning-shear mode, a trimming mode, a pick-up mode, and the like. The control module 11 controls the self-moving device 100 to perform a work task according to a preset working mode. In one embodiment, in the preset working mode, for example, the control module 11 may control the self-moving device 100 to walk according to a preset path or walk at a preset speed, control the connecting arm 60 to move according to a predetermined movement trajectory or a predetermined movement frequency, or control the working head 200 to perform a corresponding work task according to a preset path, a preset frequency or a preset position. Certainly, only examples are provided above. In one embodiment, in the preset working mode, the working statuses of the self-moving device 100 and the working head 200 are not limited to the foregoing content. In this embodiment, when the self-moving device 100 walks according to a preset path, the preset path may be formed in various forms. For example, the preset path may be formed with the guidance of the guide wire, a positioning module may be used to construct a virtual map to form the preset path or a capacitance sensor may be used to distinguish between grass and non-grass to form the preset path.

In an embodiment, the automatic working system 300 further includes a recognition module configured to recognize the working head 200 and acquire working head information in the foregoing embodiment. The control module 11 controls the self-moving device 100 and/or the working head 200 according to the working head information recognized by the recognition module to perform a work task according to a corresponding working mode. For example, when the recognition module recognizes that the working head is a pair of pruning shears, the control module 11 controls the self-moving device 100 and/or the working head 200 to perform work according to a pruning-shear mode.

In another embodiment, the automatic working system 300 further includes a signal sending module 36 sending an indication signal and the signal receiving module 163 configured to receive the indication signal. The control module 11 controls the working statuses of the self-moving device 100 and/or the working head 200 according to the indication signal. In one embodiment, in an embodiment, the plurality of preset working modes include a specified working mode. The specified working mode is one of the preset working modes. For example, in an embodiment, the specified working mode is a pruning-shear mode. The signal sending module may be integrated in a user terminal such as the remote control, the mobile phone or the computer in the foregoing embodiment. The user terminal may send a signal indicating the specified working mode. In the foregoing embodiment in which the specified working mode is the pruning-shear mode, that is, the user terminal sends a signal indicating the pruning-shear mode and the signal receiving module receives the signal indicating the pruning-shear mode, the control module 11 controls the self-moving device 100 and/or the working head 200 to perform a work task according to the pruning-shear mode.

In one embodiment, in another embodiment, the preset working mode and the protection module may be combined, so that the working head 200 performs a work task safely in the preset working mode. In one embodiment, the indication signal further includes the working signal used to indicate whether the working head is in a safe environment in the embodiment in which the automatic working system 300 has the protection module 16. The control module 11 controls the working statuses of the self-moving device 100 and/or the working head 200 according to the working signal. In one embodiment, in an embodiment, the indication signal is a wireless signal generated from an operation of a user. When the signal receiving module keeps receiving a working signal indicating that the working head is in a safe working environment, the control module 11 controls the self-moving device 100 and/or the working head 200 to work. When the signal receiving module fails to receive the working signal indicating that the working head is in a safe working environment or when the signal receiving module receives the working signal indicating that the working head is in an unsafe working environment, the control module controls the self-moving device and/or the working head to stop working. In another embodiment, the signal receiving module further includes a signal strength detection module 1631 configured to detect the strength of the indication signal. A signal strength threshold is preset. When the signal strength detection module 1631 detects that the signal strength of the indication signal is less than the signal strength threshold, the control module controls the self-moving device and/or the working head to stop working. In another embodiment, the foregoing two embodiments may be combined. The control module 11 controls the working statuses of the self-moving device and/or the working head according to content and strength indicated by the indication signal. In one embodiment, if the signal receiving module receives a signal indicating that the working head 200 is in an unsafe working environment or the signal strength detection module 1631 detects that the signal strength of a specified signal is less than the signal strength threshold, the control module 11 controls the self-moving device 100 and/or the working head 200 to stop working. Certainly, the foregoing is only some implementations in which the preset working mode and the protection module 16 are combined. In this embodiment, reference may be made to all implementations in all the embodiments in which the automatic working system 300 has the protection module 16. Details are not described one by one again herein.

In one embodiment, in another embodiment, the indication signal further includes a stop signal. When the signal receiving module receives the stop signal, the control module 11 may control the self-moving device 100 and/or the working head 200 according to the stop signal to stop working. For example, when a user discovers an emergency and the self-moving device 100 needs to stop immediately, the user may send the stop signal by using the indication signal to control the self-moving device 100 and/or the working head 200 to stop in time.

In the foregoing embodiment, the working head 200 is directly powered by the energy module of the self-moving device 100. The working head 200 and the self-moving device 100 are mechanically connected and also need to be electrically connected, to implement energy supply by the energy module of the self-moving device 100. In other embodiments, the working head 200 further includes a working head energy module configured to supply energy to the working head 200. The working head 200 is powered by the separate working head energy module. The working head 200 may be only mechanically connected to the self-moving device 100. Certainly, the working head 200 and the self-moving device 100 may still be electrically connected according to an actual case. In a specific embodiment, the self-moving device 100 includes a power module 17 such as a mowing motor and a walking motor configured to supply power to the self-moving device 100. The working head 200 further includes a working head power module 27 such as a working head motor separately configured to supply power to the working head 200. In another specific embodiment, the working head 200 may not include the separate working head power module, but instead the power module 17 of the self-moving device 100 supplies power. In one embodiment, a transmission mechanism may be disposed between the working head 200 and the power module 17. The power module supplies power to the working head 200 with the transmission by the transmission mechanism.

Figure 18:
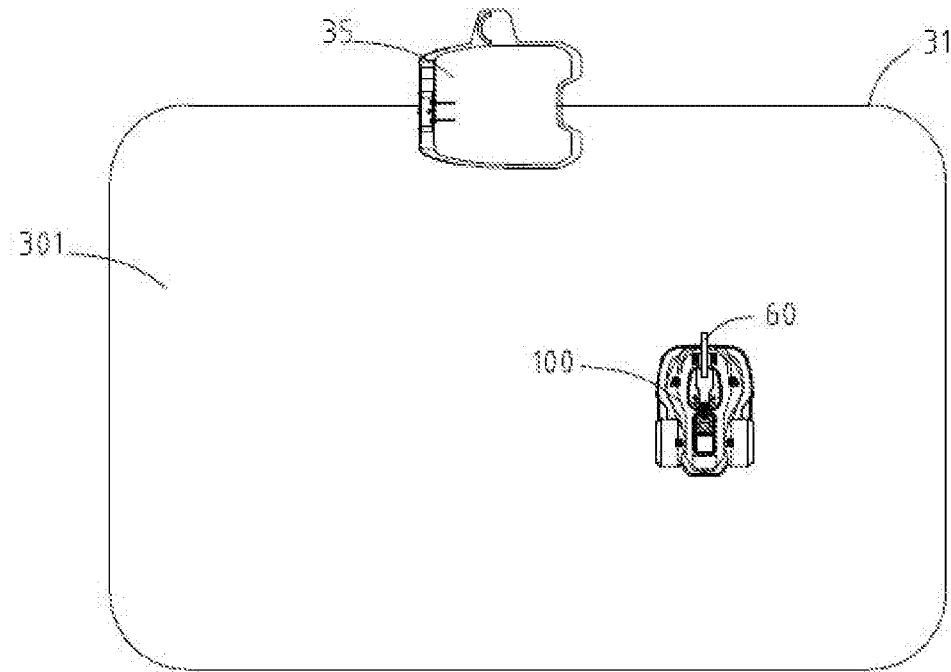
FIG. 18 is a schematic diagram of a self-moving device and a charging station in an automatic working system in a specific implementation.

In a specific embodiment, as shown in FIG. 18, the automatic working system 300 further includes a charging station 35 configured to charge the self-moving device 100. The self-moving device 100 includes a charging system configured to charge the energy module. In one embodiment, the self-moving device 100 includes an automatic charging system implementing automatic return and charging, to enable the self-moving device 100 to automatically return to the charging station 35 to perform charging. Further specifically, the self-moving device 100 includes a return charging mode. In the return charging mode, the control module 11 controls the self-moving device 100 to automatically return to the charging station 35 to be docked to the charging station 35 to charge the self-moving device 100. In one embodiment, in an embodiment, an electric power threshold is preset. When the electric power of the energy module is less than the threshold, the self-moving device 100 automatically returns to the charging station 35 to perform charging. In one embodiment, in a preset working mode, the self-moving device 100 may return to the charging station 35 according to a preset working path to perform charging. In one embodiment, in this embodiment, the preset working path may preset a path by using the guide wire. In one embodiment, the automatic working system 300 further includes a guide wire. The self-moving device 100 further includes a guide wire detection module (not shown). The guide wire detection module includes at least one guide wire detection sensor configured to detect the position relationship between the self-moving device and the guide wire. The position relationship between the self-moving device 100 and the guide wire includes the self-moving device 100 being located on either side of the guide wire, a distance between the self-moving device and the guide wire or the like. In this embodiment, the guide wire includes a boundary wire 31 defining a working area 301 of the self-moving device 100. In other embodiments, the guide wire may be a lead wire arranged in the working area, is guided out from the position of the charging station 35, and is configured to guide the self-moving device 100 to move toward the charging station 35. Certainly, the guide wire may be a physical boundary formed by a fence or the like, a physical boundary formed between a lawn and a non-lawn or the like. Correspondingly, the guide wire detection sensor may be a camera, a capacitance sensor or the like. In other embodiments, there may be no guide wire, and correspondingly, a working path may be directly preset by using a capacitance sensor, positioning module positioning, a visual manner or the like. For example, a positioning module is used to construct a virtual map to preset a working path, to control the working area of the self-moving device.

In the foregoing embodiment, only an example in which the control module 11 on the self-moving device 100 controls the self-moving device 100 and/or the working head 200 is used. In another embodiment, the working head 200 further includes a controller, and the controller controls the working statuses of the self-moving device 100 and/or the working head 200. The controller may directly control the working statuses of the self-moving device 100 and/or the working head 200, and may control the control module 11 to control the working statuses of the self-moving device 100 and/or the working head 200. In other embodiments, the controller controlling the self-moving device 100 and/or the working head 200 may be disposed in another position of the automatic working system 300. That is, the automatic working system 300 includes a controller configured to control the working statuses of the self-moving device 100 and/or the working head 200. The controller may be disposed in the self-moving device 100 and/or the working head 200 or may be disposed in another position of the automatic working system 300.

In the foregoing embodiment, the connecting arm 60 is disposed on the self-moving device 100, and the connecting arm 60 is connected to the working head 200 to perform different types of work to satisfy different environments and requirements to bring people great convenience. The working head 200 and the working module 12 may perform different work tasks, and the connecting arm 60 may be connected to the different working heads 200 or even a plurality of working heads 200, to perform different work tasks or simultaneously perform the same work task or different work tasks. Various functions are integrated in one self-moving device 100, so that the use costs are reduced while the working efficiency is improved. Moreover, the connecting arm 60 uses a special mechanism design, so that the connecting arm 60 works much more flexibly, intelligently, and precisely.

The technical features in the foregoing embodiments may be randomly combined. For simplicity of description, all possible combinations of the technical features in the foregoing embodiments are not described. However, it should be considered that these combinations of technical features fall within the scope recorded in the specification provided that these combinations of technical features do not have any conflict.

The foregoing embodiments only describe several implementations of the present invention, and their description is specific and detailed, but cannot therefore be understood as a limitation to the patent scope of the present invention. It should be noted that a person of ordinary skill in the art may further make variations and improvements without departing from the conception of the present invention, and these all fall within the protection scope of the present invention. Therefore, the patent protection scope of the present invention should be subject to the appended claims.

What is claimed is:

1. A self-moving device, comprising:
   a body;
   a movement mechanism, disposed on the body, and configured to drive the self-moving device to move;
   a connecting arm, connected to the body; and
   a controller configured to control the movement mechanism to drive the self-moving device within a defined area,
   wherein the connecting arm is selectively connected to at least one of at least two working heads configured to perform different work tasks, and the connecting arm comprises a connecting structure configured to be connected to the working head and a connecting component configured to connect the connecting structure and the body; and
   a recognition module configured to recognize the working head.

2. The self-moving device according to claim 1, wherein the control module is configured to control working statuses of the connecting arm, or the working head, or both the connecting arm and the working head.

3. The self-moving device according to claim 1, wherein an extension range of the connecting arm exceeds a range covered by a projection of the body in a horizontal direction.

4. The self-moving device according to claim 1, wherein the connecting arm is connected to the body and is movable relative to the body, or the connecting component is connected to the body and is movable relative to the body.

5. The self-moving device according to claim 4, wherein the connecting component comprises a movable fastening end fastened to the body and
   wherein the fastening end is rotatable relative to the body.

6. The self-moving device according to claim 1, wherein the connecting structure comprises a holder configured to fasten the working head.

7. The self-moving device according to claim 1, wherein the connecting structure further comprises an electrical connection configured to electrically connect the working head to the body.

8. The self-moving device according to claim 1, wherein the self-moving device detects the position of the connecting arm, and the control module controls a movement trajectory of the connecting arm according to a detection result.

9. The self-moving device according to claim 1, wherein the self-moving device further comprises an accommodating cavity configured to accommodate the working head.

10. The self-moving device according to claim 1, wherein the control module controls the connecting arm to automatically extend into the accommodating cavity to be connected to the working head.

11. The self-moving device according to claim 1, wherein the self-moving device further comprises a protection module configured to protect the safety of the working head, and the protection module comprises a protective cover disposed on the connecting arm.

12. The self-moving device according to claim 11, wherein the protection module comprises a safety detection module configured to detect whether the self-moving device is in a safe working environment, and the control module controls working statuses of the self-moving device, or the working head, or both the self-moving device and the working head according to a detection result of the safety detection module.

13. The self-moving device according to claim 1, wherein the self-moving device comprises a plurality of preset working modes, and the control module controls the self-moving device to perform a work task according to a preset working mode.

14. The self-moving device according to claim 13, wherein in the preset working mode, the control module controls the self-moving device to walk according to a preset path.

15. The self-moving device according to claim 13, wherein the self-moving device further comprises a recognition module configured to recognize the working head and acquire working head information, and the control module controls the self-moving device, or the working head, or both the self-moving device and the working head according to the working head information acquired by the recognition module to perform a work task according to a corresponding preset working mode.

16. The self-moving device according to claim 1, wherein the self-moving device further comprises a working module configured to perform a preset work task, and the working module is disposed on the body and the self-moving device is an autonomous lawnmower, and the working module is a mowing head configured to perform a mowing task.

17. An automatic working system, wherein the automatic working system comprises the self-moving device according to claim 1, and the automatic working system further comprises a working head configured to be connected to a connecting arm to perform a work task.

18. The automatic working system according to claim 17, wherein the working head is at least one of a mowing head, a blowing-sucking apparatus, a cutting apparatus, a pair of pruning shears, a trimming head, and a pick-up apparatus.

19. The automatic working system according to claim 17, wherein the automatic working system comprises at least two working heads that perform different work tasks, and the connecting arm is selectively connected to at least one working head.

\* \* \* \* \*

UNITED STATES PATENT AND TRADEMARK OFFICE
CERTIFICATE OF CORRECTION

PATENT NO. : 11,780,078 B2  
APPLICATION NO. : 16/816767  
DATED : October 10, 2023  
INVENTOR(S) : Ka Tat Kelvin Wong et al.

Page 1 of 1

It is certified that error appears in the above-identified patent and that said Letters Patent is hereby corrected as shown below:

On the Title Page

Include item (30) the Foreign Priority of:  
CHINA 201710817830.7 09/12/2017  
CHINA 201721166271.X 09/12/2017

Signed and Sealed this  
Twenty-eighth Day of October, 2025

John A. Squires  
*Director of the United States Patent and Trademark Office*